United States Patent
Poulain et al.

(10) Patent No.: US 10,759,683 B2
(45) Date of Patent: Sep. 1, 2020

(54) METHODS FOR REMOVING MERCURY CONTAMINANT FROM AQUEOUS SOLUTIONS, AND BIOREACTORS THEREFOR

(71) Applicant: University of Ottawa, Ottawa (CA)

(72) Inventors: Alexandre Poulain, Ottawa (CA); Daniel Grégoire, Ottawa (CA)

(73) Assignee: University of Ottawa, Ottawa (CA)

( * ) Notice: Subject to any disclaimer, the term of this patent is extended or adjusted under 35 U.S.C. 154(b) by 0 days.

(21) Appl. No.: 16/031,660

(22) Filed: Jul. 10, 2018

(65) Prior Publication Data
US 2020/0017381 A1    Jan. 16, 2020

(51) Int. Cl.
C02F 1/62    (2006.01)
C02F 1/70    (2006.01)
C02F 3/34    (2006.01)
C02F 101/20  (2006.01)

(52) U.S. Cl.
CPC .............. *C02F 1/62* (2013.01); *C02F 1/705* (2013.01); *C02F 3/341* (2013.01); *C02F 2101/20* (2013.01); *C02F 2203/004* (2013.01)

(58) Field of Classification Search
CPC .. C02F 1/62; C02F 3/341; C02F 1/705; C02F 2101/20; C02F 2203/004
USPC ............... 210/603, 610, 611, 914; 435/292.1
See application file for complete search history.

(56) References Cited

U.S. PATENT DOCUMENTS

| | | | | |
|---|---|---|---|---|
| 5,228,995 A | * | 7/1993 | Stover | C02F 1/006 210/150 |
| 6,923,914 B2 | * | 8/2005 | Perriello | B09C 1/002 210/610 |
| 7,790,034 B2 | * | 9/2010 | Peeters | C02F 3/006 210/615 |
| 9,932,618 B2 | | 4/2018 | Lee et al. | |

(Continued)

OTHER PUBLICATIONS

Blaschkowski et al., "Routes of flavodoxin and ferredoxin reduction in *Escherichia coli* Coa-acylating pyruvate:flavodoxin and NADPH: flavodoxin oxidoreductases participating in the activation of pyruvate formate-lyase." European Journal of Biochemistry 1982, 123:563-569.

(Continued)

*Primary Examiner* — Fred Prince
(74) *Attorney, Agent, or Firm* — Casimir Jones, S.C.; Lisa V. Mueller

(57) ABSTRACT

Provided herein are methods for removing mercury contaminant from an aqueous solution, the methods including: providing an aqueous solution, the aqueous solution being contaminated with at least trace amounts of an oxidized mercury species; culturing a photoheterotrophic or fermentative heterotrophic bacteria in the aqueous solution under anaerobic conditions in which the bacteria reduce the oxidized mercury species to elemental mercury ($Hg^0$), wherein the bacteria comprises one or more bacteria of the order Clostridiales; and removing the elemental mercury from the aqueous solution. Also provided are bioreactors for removing mercury contaminant from an aqueous solution, as well as uses of photoheterotrophic or fermentative heterotrophic bacteria, wherein the bacteria comprises one or more bacteria of the order Clostridiales, for removing mercury contaminant from an aqueous solution.

20 Claims, 16 Drawing Sheets

(56) References Cited

U.S. PATENT DOCUMENTS

| | | | |
|---|---|---|---|
| 2006/0065594 A1* | 3/2006 | Armstrong | B01D 21/0045 210/606 |
| 2011/0220570 A1* | 9/2011 | Ruiz | C02F 3/341 210/601 |
| 2014/0263039 A1* | 9/2014 | Horst | C02F 3/28 210/602 |

OTHER PUBLICATIONS

Bone et al., "Mackinawite (FeS) reduces mercury(II) under sulfidic conditions." Environ. Sci. Technol. 2014, 48 (18):10681-10689.

Caccavo et al., "*Geobacter sulfurreducens* sp-nov, a hydrogen-and acetate-oxidizing dissimilatory metal-reducing microorganism." Applied and Environmental Microbiology 1994, 60(10):3752-3759.

Colombo et al., "Anaerobic oxidation of Hg(0) and methylmercury formation by Desulfovibrio desulfuricans ND132." Geochim. Cosmochim. Acta 2013, 112: 166-177.

Grégoire et al., "A physiological role for HgII during phototrophic growth." Nature Geoscience 2016, 9, 121-125, (2016).

Gu et al., "Mercury reduction and complexation by natural organic matter in anoxic environments." Proc. Natl. Acad. Sci. U. S. A. 2011, 108(4): 1479-1483.

Hatchikian et al., Further characterization of the [Fe]-hydrogenase from Desulfovibrio desulfuricans ATCC 7757. Eur. J. Biochem. 1992, 209: 357-365.

Hoffman et al., "Preclinical studies of amixicile, a systemic therapeutic developed for treatment of Clostridium difficile infections that also shows efficacy against Helicobacter pylori." Antimicrob. Agents Chemother. 2014, 58(8): 4703-4712.

Kim et al., "A hydrogen-oxidizing and acetate-oxidizing dissimilatory metal-reducing microorganism." Applied and Environmental Microbiology 1994, 60(10): 3752-3759.

Kimble et al., "*Heliobacterium modesticaldum*, sp. nov., a thermophilic heliobacterium of hot springs and volcanic soils." Arch. Microbiol. 1995, 163(4): 259-267.

Lin et al., "Coupled mercury-cell sorption, reduction, and oxidation on methylmercury production by Geobacter sulfurreducens PCA." Environmental Science & Technology 2014, 48(20): 11969-11976.

Lovley et al., "Dissimilatory Fe(III) and Mn (IV) reduction." Advances in microbial physiology 2004, 49: 219-286.

Lu et al., "Anaerobic mercury methylation and demethylation by Geobacter bemidjiensis Bem." Environ. Sci. Technol. 2016, 50 (8), 4366-4373.

Marteyn et al., "The Synechocystis PCC6803 MerA-like enzyme operates in the reduction of both mercury and uranium under the control of the glutaredoxin 1 enzyme." J. Bacteriol. 2013, 195(18): 4138-4145.

Marvin-Dipasquale et al., "Methylmercury production in sediment from agricultural and non-agricultural wetlands in the Yolo Bypass, California, USA." Sci. Total Environ. 2014, 484:288-299.

Mckinlay et al., "Carbon dioxide fixation as a central redox cofactor recycling mechanism in bacteria." Proc. Natl. Acad. Sci. U. S. A. 2010, 107(26): 11669-11675.

Parks et al., "The genetic basis for bacterial mercury methylation." Science 2013, 339 (6125): 1332-1335.

Poulain et al., "Biological and photochemical production of dissolved gaseous mercury in a boreal lake." Limnol. Oceanogr. 2004, 49 (6), 2265-2275.

Rothenberg et al., "Mercury cycling in a flooded rice paddy." Journal of Geophysical Research: Biogeosciences 2012, 117, G03003, 16 pages.

Rothenberg et al., "Rice methylmercury exposure and mitigation: A comprehensive review." Environ. Res. 2014, 133: 407-423.

Sattley et al., "The genome of Heliobacterium modesticaldum, a phototrophic representative of the Firmicutes containing the simplest photosynthetic apparatus." J. Bacteriol. 2008, 190(13):4687-4696.

Segura et al., "Computational and experimental analysis of redundancy in the central metabolism of Geobacter sulfurreducens." PLoS Comput. Biol. 2008, 4(2): e36.

Speers et al., "Electron donors supporting growth and electroactivity of Geobacter sulfurreducens anode biofilms." Applied and Environmental Microbiology 2012, 78(2):437-444.

Tang et al., "Energy metabolism of Heliobacterium modesticaldum during phototrophic and chemotrophic growth." BMC Microbiol. 2010, 10: 150.

Vidon et al., "Mercury dynamics in groundwater across three distinct riparian zone types of the US Midwest." Environmental Sciences: Processes and Impacts 2013, 15(11):2131-2141.

Wiatrowski et al., "Novel reduction of mercury(II) by mercury-sensitive dissimilatory metal reducing bacteria." Environmental Science and Technology 2006, 40(21): 6690-6696.

Zhang et al., "In inland China, rice, rather than fish, is the major pathway for methylmercury exposure." Environ. Health Perspect. 2010, 118(9): 1183-1188.

Zhao et al., "Contrasting effects of dissolved organic matter on mercury methylation by Geobacter sulfurreducens PCA and Desulfovibrio desulfuricansND132." Environ. Sci. Technol. 2017, 51 (18), 10468-10475.

Zhao et al., "Mercury methylation in paddy soil: source and distribution of mercury species at a Hg mining area, Guizhou Province, China." Biogeosciences 2016, 13(8): 2429-2440.

Asao et al., "Taxonomy, phylogeny, and ecology of the heliobacteria." Photosynth. Res. 2010,104 (2-3): 103-111.

Bagnato et al., "Mercury concentration, speciation and budget in volcanic aquifers: Italy and Guadeloupe (Lesser Antilles)." J. Volcanol. Geotherm. Res. 2009, 179 (1-2):96-106.

Barkay et al., "A thermophilic bacterial origin and subsequent constraints by redox, light and salinity on the evolution of the microbial mercuric reductase." Environ. Microbiol. 2010, 12 (11): 2904-2917.

Bouffard et al., "Importance of elemental mercury in lake sediments." Chemosphere 2009, 74 (8): 1098-1103.

Deckwer et al., "Microbial Removal of Ionic Mercury in a Three-Phase Fluidized Bed Reactor." Environmental Science & Technology 2004, 38 (6): 1858-1865, DOI: 10.1021/es0300517.

Desrochers et al., "Effect of electron donor to sulfate ratio on mercury methylation in floodplain sediments under saturated flow conditions." Geomicrobiol. J. 2015, 32 (10): 924-933.

Fitzgerald et al., "Marine biogeochemical cycling of mercury." Chem. Rev. 2007, 107 (2): 641-662.

Girija et al., "Novel heliobacteria of a few semi-arid tropical soils." Indian J. Microbiol. 2010 (50): S17-S20.

Gregoire et al., "Heliobacteria Reveal Fermentation As a Key Pathway for Mercury Reduction in Anoxic Environments." Environ. Sci. Technol. 2018, 52 (7): 4145-4153.

Hu et al. "Oxidation and methylation of dissolved elemental mercury by anaerobic bacteria." Nat. Geosci. 2013, 6 (9): 751-754.

Liu et al., "Reduction of Hg(II) to Hg(0) by biogenic magnetite from two magnetotactic bacteria." Geomicrobiol. J. 2018, 35 (3): 198-208.

Lutke-Eversloh et al., "Metabolic engineering of Clostridium acetobutylicum: recent advances to improve butanol production." Curr. Opin. Biotechnol. 2011, 22 (5), 634-647.

Madigan et al., "The Family Heliobacteriaceae. In the Prokaryotes: vol. 4: Bacteria: Firmicutes, Cyanobacteria." 2006: 4: 951-964.

Mahadevan et al., "Characterization of metabolism in the Fe (III)-reducing organism Geobacter sulfurreducens by constraint-based modeling. Applied and environmental microbiology." 2006, 72 (2): 1558-1568.

Meng et al., "Distribution patterns of inorganic mercury and methylmercury in tissues of rice (*Oryza sativa* L.) plants and possible bioaccumulation pathways." J. Agric. Food Chem. 2010, 58 (8): 4951-4958.

Methe et al., "Genome of Geobacter sulfurreducens: Metal reduction in subsurface environments." Science 2003, 302 (5652): 1967-1969.

Poulin et al., "Mercury transformation and release differs with depth and time in a contaminated riparian soil during simulated flooding." Geochim. Cosmochim. Acta 2016, 176: 118-138.

(56) References Cited

OTHER PUBLICATIONS

Sattley et al., "Energy conservation in Heliobacteria: Photosynthesis and central metabolism. In the Structural Basis of Biological Energy Generation, Advances in Photosynthesis and Respiration." Springer Science, 2014, 39: 231-247.
Schaefer et al., "Mer-mediated resistance and volatilization of Hg(II) under anaerobic conditions." Geomicrobiol. J. 2002, 19 (1): 87-102.
Schaefer et al., "High methylation rates of mercury bound to cysteine by Geobacter sulfurreducens." Nature Geoscience 2009, 2 (2): 123-126.
Schomburg et al., "Class 1—Oxidoreductases X EC 1.9-1.14. In Springer Handbook of Enzymes." Springer-Verlag: Berlin Heidelberg, 2006; 25: 373-381.
Stevenson et al., "Characterization of new phototrophic heliobacteria and their habitats." Photosynth. Res. 1997, 53 (1): 1-12.
Tang et al., "Carbon flow of Heliobacteria is related more to Clostridia than to the green sulfur bacteria." Journal of Biological Chemistry, 2010, 285 (45): 35104-35112.
Warner et al., "Microbial mercury transformation in anoxic freshwater sediments under iron-reducing and other electron-accepting conditions." Environ. Sci. Technol. 2003, 37 (10): 2159-2165.
Wiatrowski et al., "Reduction of Hg(II) to Hg(0) by magnetite." Environ. Sci. Technol. 2009, 43 (14): 5307-5313.
Wiatrowski et al., "Novel reduction of mercury(II) by mercury-sensitive dissimilatory metal reducing bacteria." Environ. Sci. Technol. 2006, 40 (21): 6690-6696.
Zhao et al., "Mercury methylation in rice paddies and its possible controlling factors in the Hg mining area, Guizhou province, Southwest China." Environ. Pollut. 2016, 215: 1-9.

\* cited by examiner

METHODS FOR REMOVING MERCURY CONTAMINANT FROM AQUEOUS SOLUTIONS, AND BIOREACTORS THEREFOR

FIELD OF INVENTION

The present invention relates generally to cleanup and removal of mercury contamination. More specifically, the present invention relates to removal of mercury contaminant from aqueous solutions using microbes.

BACKGROUND

Mercury (Hg) is a global pollutant and potent neurotoxin.[1] Over the last 50 years over a million people have suffered from mercury poisoning, many of which are newborns that are exposed to it in the womb. The United Nations have recognized Hg as the #1 priority contaminant across the globe and have issued a mandate for the development of new cost effective and environmentally sustainable technologies to limit the impact of Hg on environmental and human health.

The accumulation of mercury (Hg) in rice, a dietary staple for over half of the world's population, is rapidly becoming a global food safety issue. Rice paddies support the anaerobic production of toxic methylmercury that accumulates in plant tissue, however the microbial controls of Hg cycling in anoxic environments remain poorly understood.

Although all chemical species of Hg are toxic, methylmercury (MeHg) is perhaps the most concerning because it bioaccumulates in the tissues of plants[2] and animals[1]. Whereas fish consumption has long been thought of as a primary route of Hg exposure for humans, contaminated rice is becoming an emerging health concern in countries facing Hg pollution issues where rice is a dietary staple[2,3].

Rice paddies are often flooded, leading to prolonged periods of anoxia and are rich with nutrients that stimulate the metabolism of iron and sulfate reducers, fermentative bacteria, and methanogenic archaea[4]. These groups of microbes are directly responsible for Hg methylation and make rice paddies methylation hotspots[3,5-9]. Similar hotspots can be found in other surface and near subsurface environments such as sediments[10] and groundwater[11]. To mitigate risk, better characterization of pathways controlling availability of inorganic Hg substrate for methylation may be particularly important[12,13].

Traditional Hg remediation technologies, and their use, typically varies depending on the site in question. Generally, such techniques may be divided into soil and water treatment strategies. Soil methods have included thermal treatment, soil washing, and soil stabilization. Water treatment methods have included Hg precipitation as a sulfide-bearing mineral, coagulation, filtration by reverse osmosis, adsorption by activated carbon, and ion exchange. Bioremediation (techniques that use living organisms for Hg removal) have been employed in both soil and water environments. Typically, bioremediation techniques have been limited to the use of plants (phytoremediation) or microbes with dedicated Hg detoxification machinery. Both bioremediation approaches have been used to a much lesser degree relative to the aforementioned physical/chemical techniques.

Disadvantages of traditional technologies typically include one or more of: high-energy costs (i.e. thermal treatment and soil washing); secondary waste production through the use of harmful chemicals (i.e. soil washing, soil stabilization, coagulation); and/or low-efficiency Hg removal (i.e. adsorption by activated carbon). Even techniques such as ion exchange have been limited by the fact that Hg does not leave the system, instead being converted to a less mobile chemical species. Costly long-term monitoring efforts are often involved to ensure the contaminant does not leach back into the environment.

Traditionally, bioremediation methods have included: using plants to absorb and/or volatilize Hg; the use of microbes or microbe-derived materials as a biosorbent or to precipitate Hg as a solid; and using Hg-resistant microbes capable of enzymatically converting Hg into a gas. Although phytoremediation is considered to be amongst the most environmentally friendly techniques, it has been limited by the high costs associated with growing and maintaining healthy plants in contaminated environments. The use of phytoremediation is also limited by the cost of properly disposing of plants contaminated with Hg, which creates an issue of secondary waste.

In terms of microbe use, a drawback for using biosorbents and microbially-catalyzed precipitation has been that the waste still needs to be monitored to ensure Hg is not getting back into the environment. Similar to the use of plants, the contaminated biomass still needs to be disposed of properly. While the use of certain Hg resistant bacteria may allow for the conversion of Hg to a gas, a notable drawback is that high levels of Hg, oxygen, and growth substrate have been required to initiate Hg removal, meaning that they are not suited for all environments/applications (i.e. particularly those devoid of oxygen). In cases where microbial strains have been genetically engineered for Hg removal, there are also concerns linked to introducing genetically modified bacteria into the environment that can disrupt ecosystem function.

Alternative, additional, and/or improved methods and processes for the removal of mercury from aqueous solutions is desirable.

SUMMARY OF INVENTION

Provided herein are methods for removing mercury contaminant from an aqueous solution, the methods including: providing an aqueous solution, the aqueous solution being contaminated with at least trace amounts of an oxidized mercury species; culturing a photoheterotrophic or fermentative heterotrophic bacteria in the aqueous solution under anaerobic conditions in which the bacteria generate reduced molecules (such as reduced redox cofactors, for example reduced ferredoxin) that reduce the oxidized mercury species to elemental mercury (Hg), wherein the bacteria comprises one or more bacteria of the order Clostridiales; and removing the elemental mercury from the aqueous solution. Also provided are bioreactors for removing mercury contaminant from an aqueous solution, as well as uses of photoheterotrophic or fermentative heterotrophic bacteria, wherein the bacteria comprises one or more bacteria of the order Clostridiales, for removing mercury contaminant from an aqueous solution.

Previously, bioremediation techniques using microbes to remove mercury have typically required oxygen, were not adaptable between light and dark conditions (i.e. between phototrophic and chemotrophic/fermentative conditions), and/or employed genetically modified microbes designed for mercury processing (creating potential risks of ecosystem disruption in the event of release). Provided herein are mercury removal techniques which, in certain embodiments, may overcome or reduce some or all of these limitations.

In certain embodiments, there is provided herein a use of anaerobic phototrophic and/or fermentative microbes for generating reduced molecule(s) (such as low potential reduced redox cofactor(s), i.e. reduced ferredoxin) during anaerobic phototrophic or fermentative growth, which may reduce oxidized mercury (i.e. $Hg^{II}$) to its elemental and gaseous form ($Hg^0$), the microbes typically belonging to the order Clostridiales.

In an embodiment, there is provided herein a method for removing mercury contaminant from an aqueous solution, said method comprising:

providing an aqueous solution, the aqueous solution being contaminated with at least trace amounts of an oxidized mercury species;

culturing a photoheterotrophic or fermentative heterotrophic bacteria in the aqueous solution under anaerobic conditions in which the bacteria reduce the oxidized mercury species to elemental mercury ($Hg^0$), wherein the bacteria comprises one or more bacteria of the order Clostridiales; and removing the elemental mercury from the aqueous solution.

In another embodiment of the above method, the bacteria may be capable of fermentative growth, and the conditions may be anaerobic chemotrophic conditions causing fermentative metabolism in the bacteria.

In still another embodiment of the above method or methods, the oxidized mercury species may be $Hg^{II}$.

In yet another embodiment of the method or methods above, the bacteria may generate low potential reduced ferredoxin and/or another reduced redox cofactor, which may act to reduce the oxidized mercury species to elemental mercury.

In still another embodiment of the above method or methods, the bacteria may be a member of the family Heliobacteria. In yet another embodiment of the above method or methods, the bacteria may be *Heliobacterium modesticaldum*. In still another embodiment of the above method or methods, the bacteria may be *Heliobacterium modesticaldum* Ice1. In yet another embodiment of the above method or methods, the bacteria may be *Clostridium acetobutylicum*. In another embodiment of the above method or methods, the bacteria may be *Clostridium acetobutylicum* ATCC 824.

In yet another embodiment of the above method or methods, the conditions may include supplementation with pyruvate or other fermentable carbon source, yeast extract or other growth medium, or both.

In still another embodiment of the above method or methods, the conditions may include supplementation with $NO_2^-$ or other inhibitor(s) of a hydrogenase, such as an [Fe]-hydrogenase.

In yet another embodiment, the bacteria may be photoheterotrophic, and the conditions may be anaerobic photoheterotrophic conditions using light as an energy source.

In another embodiment of the above method, the oxidized mercury species may be Hg(II).

In yet another embodiment of the above method or methods, the bacteria may generate low potential reduced ferredoxin and/or another reduced redox cofactor, which may act to reduce the oxidized mercury species to elemental mercury.

In another embodiment of the above method or methods, the photoheterotrophic bacteria may be a bacteria of the family Heliobacteria. In yet another embodiment of the above method or methods, the photoheterotrophic bacteria may be *Heliobacterium modesticaldum*, or *Heliobacillus mobilis*. In still another embodiment of the above method or methods, the bacteria may be *Heliobacterium modesticaldum* Ice1.

In still another embodiment of the above method or methods, the conditions may be substantially free of acetate or related organic compounds such that bacterial growth by consuming reduced ferredoxin may be reduced or prevented.

In another embodiment of the above method or methods, the conditions may include supplementation with pyruvate or other organic compounds for bacterial growth, yeast extract or other growth medium, or both.

In yet another embodiment of the above method or methods, the reduction of the oxidized mercury species to elemental mercury may not be mer-operon dependent.

In yet another embodiment of the above method or methods, the step of removing the elemental mercury ($Hg^0$) from the aqueous solution may comprise evolving the elemental mercury from the aqueous solution as a gas.

In another embodiment of the above method or methods, the step of removing the elemental mercury may further comprise capturing the elemental mercury gas in an activated charcoal filter.

In another embodiment, there is provided herein a bioreactor for removing mercury contaminant from an aqueous solution, the bioreactor comprising:

a reacting chamber for housing an aqueous solution contaminated with at least trace amounts of an oxidized mercury species, and one or more inlets for supplying a culture of photoheterotrophic or fermentative bacteria comprising one or more bacteria of the order Clostridiales to the aqueous solution under anaerobic conditions in which the bacteria generate reduced ferredoxin and/or another reduced redox cofactor, which acts to reduce the oxidized mercury species to elemental mercury ($Hg^0$); and one or more collectors for elemental mercury ($Hg^0$) gas evolving from the aqueous solution, thereby removing the elemental mercury from the aqueous solution.

In another embodiment of the bioreactor, the reacting chamber may be configured to block light and trigger fermentative metabolism in the bacteria.

In still another embodiment, the reacting chamber may be configured to provide anaerobic photoheterotrophic conditions using light as an energy source.

In yet another embodiment, the bioreactor may be configurable to block light and trigger fermentative metabolism in the bacteria, or to provide anaerobic photoheterotrophic conditions using light as an energy source, in the reacting chamber.

In still another embodiment of the bioreactor or bioreactors above, the one or more collectors may comprise an outlet for exhausting elemental mercury ($Hg^0$) gas from the reacting chamber.

In yet another embodiment of the bioreactor or bioreactors above, the one or more collectors may comprise a trap for capturing the elemental mercury gas evolving from the aqueous solution.

In another embodiment of the bioreactor or bioreactors above, the outlet may be configured with a trap for capturing the elemental mercury gas to prevent release to the environment.

In still another embodiment of the bioreactor or bioreactors above, the trap may comprise an activated charcoal filter for capturing the elemental mercury gas.

In yet another embodiment, there is provided herein a use of a photoheterotrophic or fermentative heterotrophic bacteria, wherein the bacteria comprises one or more bacteria of the order Clostridiales, for removing mercury contaminant from an aqueous solution, wherein the bacteria is for culturing in the aqueous solution under anaerobic conditions in which the bacteria reduce the oxidized mercury species to elemental mercury ($Hg^0$).

In another embodiment of the above use, the bacteria may be for use in generating low potential reduced ferredoxin and/or another reduced redox cofactor, which may act to reduce the oxidized mercury species to elemental mercury.

In another embodiment of the above use or uses, the photoheterotrophic or fermentative heterotrophic bacteria may be for use in a method as described herein, or in a bioreactor as described herein.

DETAILED DESCRIPTION

Figure 1:
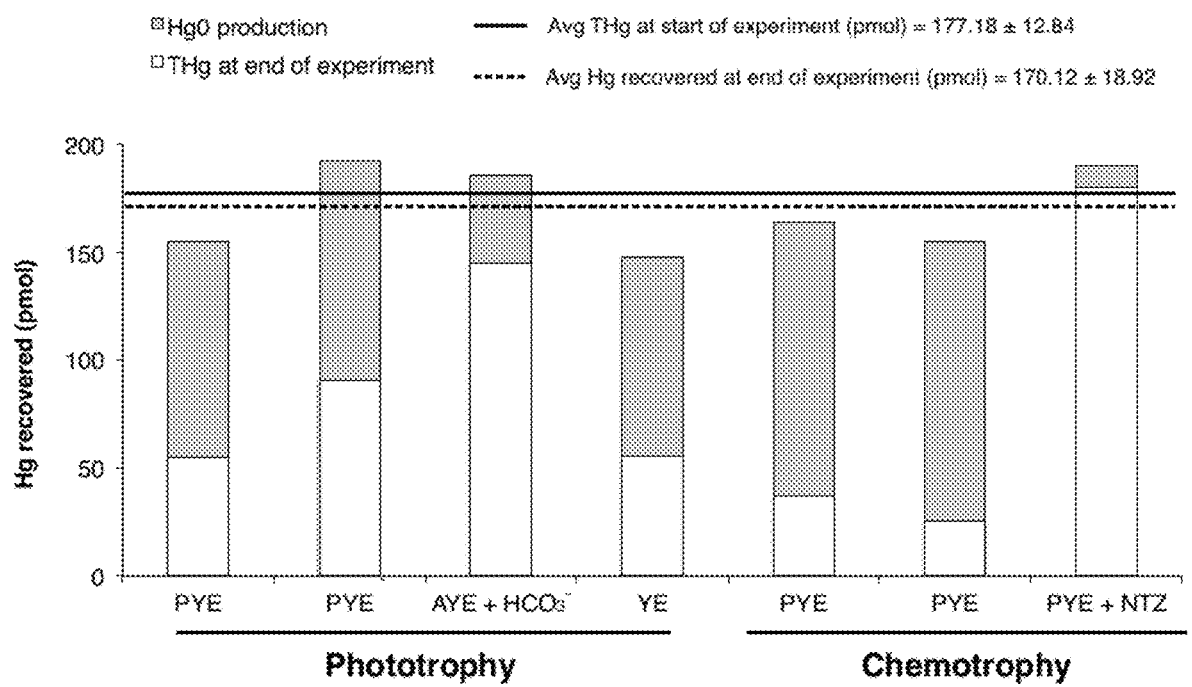
FIG. 1 shows total Hg mass balance for select experiments with live *Heliobacterium modesticaldum* Ice1 grown phototrophically and chemotrophically. The average and standard deviation for quantities of Hg recovered at the beginning and end of the experiment are based on a sample size of n=7.

Described herein are methods and processes for removing mercury contaminant from aqueous solutions, as well as bioreactors and uses of photoheterotrophic or fermentative heterotrophic bacteria relating thereto, the bacteria belonging to the order Clostridiales. It will be appreciated that embodiments and examples are provided for illustrative purposes intended for those skilled in the art, and are not meant to be limiting in any way.

As described in further detail herein, chemical metal(loid) reduction in solution may be achieved using particular microbes. Methods and processes described herein may use photosynthetic and/or fermentative bacteria of the order Clostriales to generate low potential reduced molecules (also referred to herein as reduced redox cofactors) through light-induced redox reactions and/or the oxidation of organic carbon. This process is applied herein for mercury removal using cells that convert oxidized mercury species dissolved in water into a reduced gaseous form. As described herein, such processes and methods may be configured to function with light as an energy source, but may also be configured to work in the dark. Due to the microbial metabolism involved, methods and processes described herein are performed in the absence of oxygen. Interestingly, such processes/methods may operate independently of terminal electron acceptors typically required under anoxic conditions (i.e. nitrate and sulfate). Methods and processes described herein may, in certain embodiments, be configured to take advantage of native microbial communities (such as those found in in rice paddies, for example) to limit mercury from getting converted into its organic form and subsequently bioaccumulated in plants.

It is contemplated that methods and processes described herein may be designed to limit the exposure risks for humans and ecosystems alike to Hg by converting Hg in water into a gas that can be readily captured using established technologies (i.e. activated carbon filters). Results herein indicate that certain microbes naturally found in the environment may be used to provide a low energy and/or low cost alternative to certain traditional technologies. Furthermore, results indicate that Hg removal from water may be maintained with methods/processes described herein without the use of certain additional harmful chemicals.

In an embodiment, there is provided herein a method for removing mercury contaminant from an aqueous solution, said method comprising:

providing an aqueous solution, the aqueous solution being contaminated with at least trace amounts of an oxidized mercury species;

culturing a photoheterotrophic or fermentative heterotrophic bacteria in the aqueous solution under anaerobic conditions in which the bacteria reduce the oxidized mercury species to elemental mercury (Hg$^0$), wherein the bacteria comprises one or more bacteria of the order Clostridiales; and removing the elemental mercury from the aqueous solution.

In certain embodiments, the bacteria may generate reduced ferredoxin and/or another reduced redox cofactor, which may act to reduce to oxidized mercury species to elemental mercury. In certain embodiments, the reduced ferredoxin and/or another reduced redox cofactor may be a low potential reduced ferredoxin and/or another low potential reduced redox cofactor.

In certain embodiments, the step of culturing may be performed in a bioreactor system.

In certain embodiments, the conditions of the culturing step may be anaerobic chemotrophic conditions causing fermentative metabolism in the bacteria. Alternatively, in certain embodiments, the bacteria may be photoheterotrophic, and the conditions of the culturing step may be anaerobic photoheterotrophic conditions using light as an energy source. As described in further detail herein, it has been found that both conditions may lead to the production of low potential reduced ferredoxin that can subsequently be used to reduce Hg, depending on the particular application and/or bacteria used.

As will be understood, the aqueous solution may comprise any suitable aqueous or substantially aqueous solution which is contaminated with, or which is at risk of being contaminated with, an oxidized mercury species, typically $Hg^{II}$. In certain embodiments, the aqueous solution may comprise a mining waste; a metal refining waste; a waste effluent from chlor-alkali production; a petroleum product extraction waste; an agricultural irrigation water waste; a municipal waste water; a water-logged soil and/or sediment associated with rice paddies or other such water-logged soil and/or sediment from the environment; or another aqueous-based solution, effluent, sludge, biosolid, or water-logged substrate.

Since a photoheterotrophic or fermentative heterotrophic bacteria is being cultured in the aqueous solution as part of the method, certain upstream treatments or transformations may be performed on the aqueous solution in preparation for the step of culturing. By way of example, the waste to be treated may be made suitably aqueous (if it is not already) through addition of water or an aqueous solution (i.e., water may be added to a contaminated soil in order to provide an aqueous solution for treatment, for example). As well, conditions of the aqueous solution may be made hospitable to the photoheterotrophic or fermentative heterotrophic bacteria used in the step of culturing. For example, a pH adjustment and/or dilution of the waste may be performed to provide the aqueous solution in suitable form for the step of culturing. The person of skill in the art having regard to the teachings herein will be aware of suitable upstream treatments which may be performed, based on the nature of the waste to be treated, the bacteria being used, and the desired conditions of the culturing step (i.e. phototrophic or chemotrophic/fermentative, for example).

By way of non-limiting and illustrative example, conditions suitable for phototrophic growth of microbes and mercury removal may comprise one or more of:

A temperature in a range of about 25 to about 50° C.;

A pH in a range of about 6.8 to about 7.0;

A light source and intensity as follows:
  Visible light from an incandescent bulb at about 1000 lux (or about 20 µmol $m^{-2}s^{-1}$);
  Higher light intensities preferred for microbial growth may support higher Hg removal;

A cell density as measured via optical density at 600 nm as follows:
  For *H. modesticaldum*: about 0.1 to about 0.5;
  For *H. mobilis*: about 0.1 to about 0.2;

A Hg concentration as follows:
  An Hg concentration of up to about 500 nM;
  As described in further detail below, mercury removal has been tested over a range of 250 pM to 10 nM;

A gas supply of nitrogen or argon;

Carbon source(s) and concentration(s) as follows:
  Pyruvate—about 0 to about 20 mM;
  Yeast extract—about 0 to about 10 g $L^{-1}$;
  Or an absence of organic carbon, although this condition may be suboptimal.

As will be understood, cell density and Hg concentration may be varied as desired. For example, in embodiments where higher mercury concentrations are present (for example, mercury concentrations beyond those described above, such as those in the µM range), it is contemplated that the cell density may be increased accordingly to accommodate the increased mercury levels.

Also by way of non-limiting and illustrative example, conditions suitable for chemotrophic growth of microbes and mercury removal may comprise one or more of:

A temperature in a range of about 25 to about 50° C.;

A pH in a range of about 6.8 to about 7.0;

A cell density as measured via optical density at 600 nm as follows:
  For *H. modesticaldum*: about 0.03 to about 0.3;
  For *C. acetobutylicum*: about 0.03 to about 1.2;

A Hg concentration as follows:
  An Hg concentration of up to about 500 nM;
  As described in further detail below, mercury removal has been tested over a range of 250 pM to 10 nM;

A gas supply of nitrogen or argon;

Carbon source(s) and concentration(s) as follows:
  Pyruvate—about 0.2 to about 20 mM;
  Glucose—about 28 mM;
  Yeast extract—about 4 to about 10 g $L^{-1}$;
  Peptone—about 10 g $L^{-1}$.

As will be understood, cell density and Hg concentration may be varied as desired. For example, in embodiments where higher mercury concentrations are present (for example, mercury concentrations beyond those described above, such as those in the M range), it is contemplated that the cell density may be increased accordingly to accommodate the increased mercury levels.

In the step of culturing, a photoheterotrophic or fermentative heterotrophic bacteria comprising one or more bacteria of the order Clostridiales is cultured in the aqueous solution under anaerobic conditions in which the bacteria reduce the oxidized mercury species to elemental mercury ($Hg^0$). Examples 1 and 2 below provide detailed examples of conditions which may be used for such culturing (in either anaerobic chemotrophic conditions, or anaerobic photoheterotrophic conditions), however the person of skill in the art having regard to the teachings herein will be able to select suitable culturing conditions tailored to the particular application, configuration, waste to be treated, bacteria being used, and phototrophic or chemotrophic mode desired. Typically, the culturing conditions will be oxygen-free (i.e. anoxic), and will be either phototrophic or chemotrophic/fermentative depending on the desired operation mode and bacteria used.

A variety of conditions and variables have been tested in the Examples section below. By way of non-limiting and illustrative example, preferred conditions identified for phototrophic growth of microbes and mercury removal may comprise one or more of:

A temperature of about 50° C.;

A pH in a range of about 6.8 to about 7.0;

A light source and intensity as follows:
  Visible light from an incandescent bulb at about 1000 lux (or about 20 µmol $m^{-2}s^{-1}$);

A cell density as measured via optical density at 600 nm as follows:
  For *H. modesticaldum*: about 0.1 to about 0.5;

Hg concentration as follows:
  An Hg concentration of up to about 500 nM;
  As described in further detail below, mercury removal has been tested over a range of 250 pM to 10 nM;

A gas supply of nitrogen or argon;

Carbon source(s) and concentration(s) as follows:
  Pyruvate—about 20 mM;
  Yeast extract—about 4 g $L^{-1}$.

By way of further non-limiting and illustrative example, preferred conditions identified for chemotrophic growth of microbes and mercury removal may comprise one or more of:

- A temperature of about 50° C.;
- A pH of about 6.8 to about 7.0;
- A cell density as measured via optical density at 600 nm as follows:
  - For *H. modesticaldum*: about 0.03 to about 0.3;
- A Hg concentration as follows:
  - An Hg concentration of up to about 500 nM;
  - As described in further detail below, mercury removal has been tested over a range of 250 pM to 10 nM;
- A gas supply of nitrogen or argon;
- Carbon source(s) and concentration(s):
  - Pyruvate—about 20 mM;
  - Yeast extract—about 4 g $L^{-1}$.

As will be understood, where the step of culturing provides anaerobic chemotrophic conditions causing fermentative metabolism, the step of culturing may further comprise supplementing the aqueous solution with pyruvate, or other suitable fermentable carbon source (which is suitable for the bacteria being used). In certain embodiments, the step of culturing may comprise supplementing the aqueous solution with one or more of pyruvate, glucose, yeast extract, and/or peptone. In certain embodiments, the pyruvate may be supplemented at a concentration of about 0.2 to about 20 mM. In certain embodiments, the glucose may be supplemented at a concentration of about 28 mM. In certain embodiments, the yeast extract may be supplemented at a concentration of about 0.4 to about 10 $gL^{-1}$. In certain embodiments, the peptone may be supplemented at a concentration of about 10 g $L^{-1}$.

In certain embodiments, the step of culturing may further comprise a step of supplementing the aqueous solution with a suitable growth medium. In certain embodiments, for example, the growth medium may comprise a yeast extract. Accordingly, in certain embodiments, yeast extract may be considered as both an organic carbon source, and a growth medium.

In certain embodiments, the step of culturing may further comprise supplementing the aqueous solution with $NO_2^-$, or other inhibitor(s) of hydrogenases, such as an [Fe]-hydrogenase. Hydrogenase may represent a competing pathway for reduced redox cofactor(s) such as ferredoxin, and so in certain embodiments one or more inhibitors may be used for inhibiting pathway(s) which compete for low potential reduced redox cofactor(s), for example. Inhibitors may include, for example, small molecules, or inhibition may be accomplished by gene knockdown or knockout, for example.

Where the step of culturing provides anaerobic photoheterotrophic conditions using light as energy source, the step of culturing may employ conditions which are substantially free of acetate or related organic compounds such that bacterial growth by consuming reduced ferredoxin or related reduced compounds is reduced or prevented.

In certain embodiments, to reduce or prevent bacterial growth by consuming reduced ferredoxin or related reduced compounds, the following conditions may be avoided:

- Acetate, such as acetate at a concentration of about 30 mM;
- $HCO_3^-$ (bicarbonate), such as bicarbonate at a concentration of about 10 mM;
- Nitrogen gas under conditions in which reduced nitrogen is not available.

In certain embodiments, it is contemplated that reduced redox cofactors as described herein may include one or more of reduced ferredoxins; NADH (nicotinamide adenine dinucleotide); NADPH (nicotinamide adenine dinucleotide phosphate); $FADH_2$ (flavin adenine dinucleotide); or rubredoxin or thioredoxins (iron sulfur proteins similar to ferredoxin); or any combination thereof.

In certain embodiments, the step of culturing may further comprise supplementing the aqueous solution with pyruvate or other organic compounds for bacterial growth. In certain embodiments, the step of culturing may comprise supplementing the aqueous solution with one or more of pyruvate, glucose, yeast extract, and/or peptone. In certain embodiments, the pyruvate may be supplemented at a concentration of about 0.2 to about 20 mM. In certain embodiments, the glucose may be supplemented at a concentration of about 28 mM. In certain embodiments, the yeast extract may be supplemented at a concentration of about 0.4 to about 10 g $L^{-1}$. In certain embodiments, the peptone may be supplemented at a concentration of about 10 g $L^{-1}$.

In certain embodiments, the step of culturing may further comprise a step of supplementing the aqueous solution with yeast extract or other suitable growth medium, as described above.

As will be understood, the photoheterotrophic or fermentative bacteria may be any suitable bacteria comprising one or more bacteria of the order Clostridiales which, under the anaerobic conditions used in the step of culturing, are able to reduce oxidized mercury species in the aqueous solution to elemental mercury ($Hg^0$).

In certain embodiments, photoheterotrophic bacteria may include any suitable bacteria that can grow using light for energy and organic carbon to generate new biomass. In yet other embodiments, fermentative bacteria may include any suitable bacterial which can grow using an organic carbon source as a source of energy and can also use it to create biomass, and can do so in the absence of an exogenous terminal electron acceptor (ex: nitrate, sulphate, iron).

Where the culturing conditions are anaerobic chemotrophic conditions, the bacteria may be a bacterium of the order Clostridiales which is capable of fermentative metabolism, and able to reduce oxidized mercury species in the aqueous solution to elemental mercury ($Hg^0$). In certain embodiments, the bacteria may be a bacteria of the family Heliobacteria. In certain embodiments, the bacteria may be *Heliobacterium modesticaldum*. In still a further embodiment, the bacteria may be *Heliobacterium modesticaldum* Ice1. In yet another embodiment, the bacteria may be *Clostridium acetobutylicum*. In still a further embodiment, the bacteria may be *Clostridium acetobutylicum* ATCC 824.

In certain embodiments, chemotrophy may be considered as a mode of growth that uses the oxidation of organic and inorganic compounds for cells to generate reduced redox cofactors such as ferredoxin (or another reduced redox cofactor such as those already described above). In certain embodiments, chemotrophy may be considered as a mode of growth which does not require light, and uses suitable organic carbon sources that support fermentation (such as those previously described).

Where the culturing conditions are anaerobic photoheterotrophic conditions using light as energy source, the bacteria may be a bacteria of the order Clostridiales which is capable of phototrophic metabolism using light as an energy source, and able to reduce oxidized mercury species in the aqueous solution to elemental mercury ($Hg^0$). In certain embodiments, the bacteria may be a bacteria of the family Heliobacteria. In certain embodiments, the bacteria may be *Heliobacterium modesticaldum*. In still a further embodiment, the bacteria may be *Heliobacterium modesticaldum* Ice1. In certain embodiments, the bacteria may be *Heliobacillus mobilis*.

In certain embodiments, phototrophic growth may be considered as a mode of growth wherein cells can generate energy using specialized pigments that can harvest light energy. In certain embodiments, phototrophic growth may be considered as using light and suitable organic carbon sources to support growth (i.e. photoheterotrophic growth).

As a result of being reduced by the bacteria, oxidized mercury species in the aqueous solution will be converted to elemental mercury ($Hg^0$), which is gaseous and will evolve from the aqueous solution, thereby becoming removed from the aqueous solution. Typically, the gaseous form mercury will be vented/exhausted away from the aqueous solution to prevent re-contamination thereof, and/or will be trapped using mercury-trapping equipment such as, but not limited to, an activated charcoal filter or other such trap for capturing mercury gas from air.

As will be understood, in embodiments described herein, reduction of the oxidized mercury species to elemental mercury may be achieved in a manner which is not mer-operon dependent. The mer-operon may be generally considered as a series of genes that encode dedicated scavenging, transport, and detoxification machinery for Hg. Generally speaking, the mer-operon is associated with an aerobic chemotrophic lifestyle. To date there is little evidence demonstrating the presence of the operon in microbes capable of fermentation and phototrophic growth. To the best of the inventors knowledge, the mer operon responds purely because of the detoxification needs of the cells and is tightly regulated by a transcription regulator encoded by the gene merR. Methods as described herein may utilize the metabolic machinery already present in the bacterial strains, rather than a series of genes encoding dedicated mercury detoxification strategies which according to genomic information are not present.

In yet another embodiment, there is provided herein a bioreactor for removing mercury contaminant from an aqueous solution, the bioreactor comprising:
- a reacting chamber for housing an aqueous solution contaminated with at least trace amounts of an oxidized mercury species, and one or more inlets for supplying a culture of photoheterotrophic or fermentative bacteria comprising one or more bacteria of the order Clostridiales to the aqueous solution under anaerobic conditions in which the bacteria generate reduced ferredoxin and/or another reduced redox cofactor, which acts to reduce the oxidized mercury species to elemental mercury ($Hg^0$); and
- one or more collectors for elemental mercury ($Hg^0$) gas evolving from the aqueous solution, thereby removing the elemental mercury from the aqueous solution.

As will be understood, the reacting chamber may comprise generally any suitable design for accommodating the aqueous solution and for culturing the photoheterotrophic or fermentative heterotrophic bacteria therein under appropriate conditions for producing elemental mercury gas.

In certain embodiments, the reacting chamber may be configured to provide anaerobic conditions. In certain embodiments, the reacting chamber may be configured to block light and trigger fermentative metabolism in the bacteria. Alternatively, in certain embodiments, the reacting chamber may be configured to provide anaerobic photoheterotrophic conditions using light as an energy source. In certain embodiments, depending on the bacteria used and the particular application, the bioreactor may be configurable to block light and trigger fermentative metabolism in the bacteria, or to provide anaerobic photoheterotrophic conditions using light as an energy source, in the reacting chamber. In such embodiments, the bioreactor may be configured to allow for a user to switch between anaerobic chemotrophic conditions (i.e. fermentation), and anaerobic photoheterotrophic conditions using light as an energy source, as desired.

In certain embodiments of the bioreactor, the one or more collectors may comprise an outlet for exhausting or venting elemental mercury ($Hg^0$) gas from the reacting chamber, thereby preventing mercury from re-entering the aqueous solution. In certain embodiments, the one or more collectors may comprise a trap for capturing the elemental mercury gas evolving from the aqueous solution. In certain embodiments, the outlet may be configured with the trap for capturing the elemental mercury gas to prevent release to the environment. In certain embodiments, the trap may comprise an activated charcoal filter, or other suitable mercury trap for capturing the elemental mercury gas.

Figure 16:
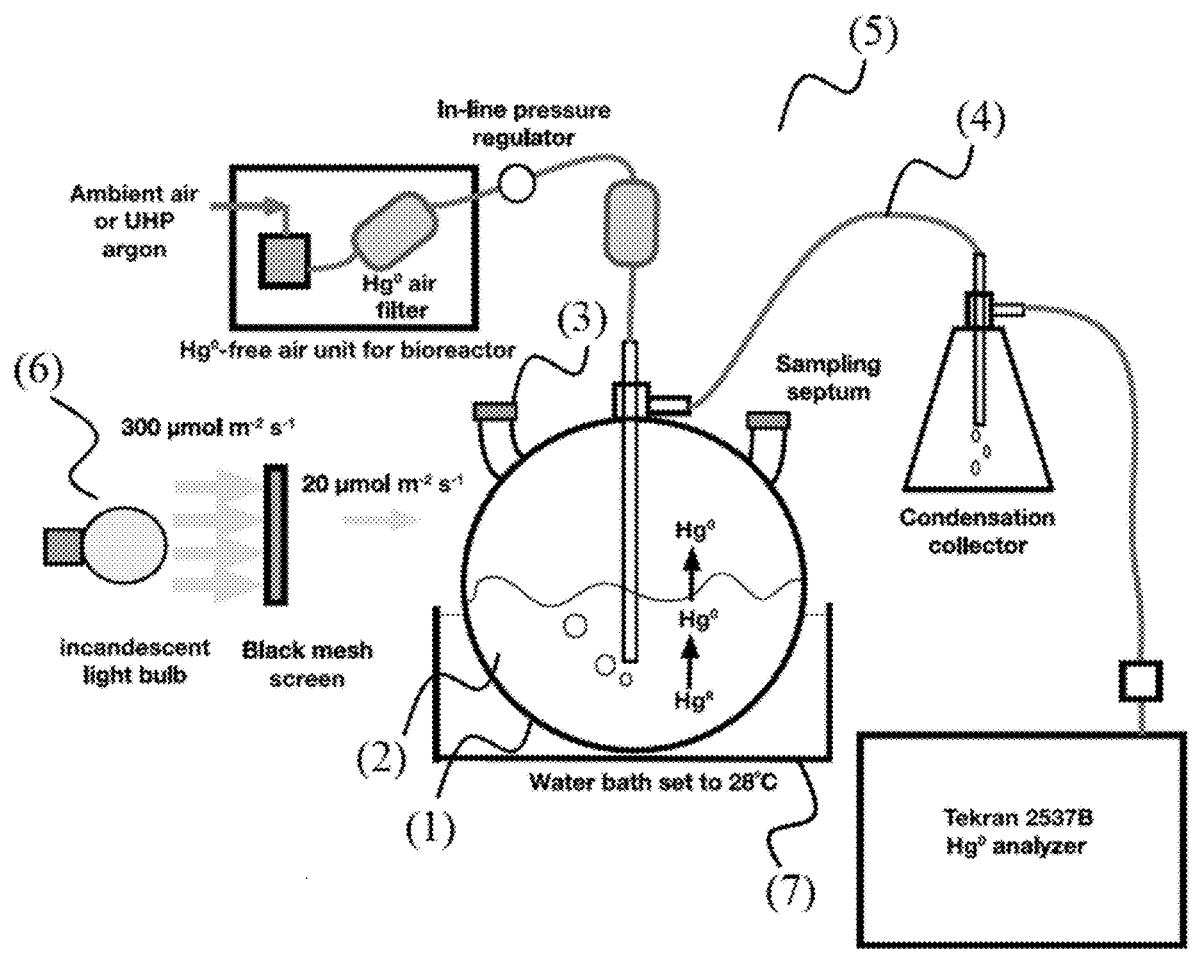
FIG. 16 depicts an example of a bioreactor used for testing mercury reduction as described in Example 1.

An example of an embodiment of a bioreactor as described herein is depicted in FIG. 16, which is configured for measuring $Hg^0$ production levels (the depicted bioreactor is very similar to that used in Example 1 below to investigate $Hg^0$ production). In the depicted bioreactor (5), a reacting chamber (1) is provided which is housing an aqueous solution (2) contaminated with at least trace amounts of an oxidized mercury species. One or more inlets (3) are provided for supplying a culture of photoheterotrophic or fermentative heterotrophic bacteria, wherein the bacteria comprises one or more bacteria of the order Clostridiales, to the aqueous solution (2) under anaerobic conditions in which the bacteria reduce the oxidized mercury species to elemental mercury ($Hg^0$). As will be understood, in certain embodiments, the bacteria may be added to the aqueous solution prior to the aqueous solution entering the reacting chamber, or the bacteria may be input into the reacting chamber through the same inlet as the aqueous solution, either simultaneously therewith or before or after the aqueous solution. Thus, in certain embodiments, the reacting chamber may include one inlet, or more than one inlet, for adding the aqueous solution and bacteria (simultaneously or sequentially, mixed or separately) to the reacting chamber (2). $Hg^0$ gas is shown evolving from the aqueous solution. One or more collectors (4), in the form of an outlet for exhausting or venting elemental mercury ($Hg^0$) gas from the reacting chamber in the depicted example, is provided. In this example, the collector (4) outlet is in communication with a $Hg^0$ analyzer for measuring levels of $Hg^0$ produced. In other embodiments, the outlet may, for example, include a charcoal filter trap for capturing $Hg^0$ to prevent release to the environment. The depicted bioreactor (5) includes a light source (6) when operation under phototrophic conditions is desired, and a temperature controller (7), in this case a water bath, is provided for regulating temperature of the reacting chamber (2).

The system depicted in FIG. 16 is a borosilicate glass bioreactor with a volume of 1000 mL in the shape of a sphere. It has an inlet line for gas and an outlet line that vents the headspace, allowing gaseous $Hg^0$ to escape. Nitrogen and argon are examples of suitable gasses that may be run through the bioreactor, and the reactor is continuously supplied with gas during its operation. All gas supplied to the bioreactor is run through a Tekran brand $Hg^0$ free air pump and 2×activated carbon filters to ensure no trace $Hg^0$ is present in the gas. There is a flow meter immediately prior to the bioreactor as a redundant measure to control the gas flow being supplied. The outlet line is connected to an $Hg^0$ analyzer that allows measurement of $Hg^0$ production in real time when working at trace levels of Hg. For work at higher concentrations (e.g. nM to μM range), this analyzer may be substituted for gold traps to capture $Hg^0$. On two of the necks there are rubber septa that may be used to insert liquid or remove liquid for subsampling using needles. All other lines for gas are made of Teflon to ensure they are free of trace metals. The bioreactor itself is housed in heated water bath or incubator set to the desired temperature. The light source provided in this case is a 200 W incandescent light bulb and the intensity is controlled using shading from window screens.

For larger scale and/or industrial applications, it is contemplated that modifications may be made. By way of example, the reactor material may be resistant to heat for sterilization purposes (i.e. glass, stainless steel, or a hybrid allowing the entry of light). Further, in certain embodiments, the reactor may also be moved from a batch process (e.g. complete take down required for each batch of aqueous solution treated) to a continuous process that maintains an optimal cell culture to waste ratio. In certain embodiments, it is contemplated that as part of this continuous system several inlet and/or outlet lines and/or sensor probes may be included, for example as follows:

For the inlet lines, acid/base inlet line(s) may be included for pH adjustment, nutrient solution line(s), waste/aqueous solution input line(s), microbial culture influx line(s), water for dilution line(s), gas for maintaining anoxia line(s), and/or line(s) for venting $Hg^0$, or any combination thereof, or any dual or multi-function line(s) configured for input and/or output of any two or more of these component(s), for example. In certain embodiments, one or more input lines compatible with the aqueous waste at the particular site and/or application may be included.

For outlet lines, discarding spent medium line(s), spent acid/base solution line(s), line(s) for venting reactor in case of pressure building, line(s) for eliminating old microbial culture as a diluted biosolid, and/or line(s) for providing an outlet for an aqueous solution that has been treated, or any combination thereof, or any dual or multi-function line(s) configured for input and/or output of any two or more of these component(s), for example.

For sensors, one it is contemplated that in certain embodiments one or more probes for monitoring the pH, temperature, oxygen concentration, redox potential, conductivity, turbidity and/or light intensity within the reaction vessel may be included.

In certain embodiments, modification for larger scale and/or industrial applications may result in a large continuously stirred or packed-bed bioreactor system. The latter system may include a physical substrate (for example, beads heavier than aqueous solution) to which the bacteria can stick, and may allow having an aqueous solution continuously flow through with minimal microbial culture removal, and an agitator may, or may not, be included. Examples of continuously stirred bioreactors may include those described at http://www.ecs.umass.edu/che/hensongroup/research/bioreactor.html, for example. Examples of fixed or packed-bed bioreactors may include those described at https://www.the-scientist.com/technology-profile/scaling-up-cell-culture-50942, for example.

In yet another embodiment, there is provided herein a use of a photoheterotrophic or fermentative heterotrophic bacteria, wherein the bacteria is a bacteria of the order Clostridiales, for removing mercury contaminant from an aqueous solution, wherein the bacteria is for culturing in the aqueous solution under anaerobic conditions in which the bacteria reduce the oxidized mercury species to elemental mercury ($Hg^0$). In still another embodiment, the photoheterotrophic or fermentative heterotrophic bacteria may be for use in a method as described herein, or in a bioreactor as described herein.

In certain embodiments, the bacteria may be for use in generating reduced ferredoxin and/or another reduced redox cofactor, which may act to reduce the oxidized mercury species to elemental mercury.

As will be understood, processes described herein may, in certain embodiments, employ microbes which are naturally found in the environment (i.e. which are not genetically modified), thereby removing risk of introducing genetically modified microbes into a given ecosystem. In certain embodiments, such microbes may use metabolism, rather than dedicated mercury processing enzymes, for converting mercury. Without wishing to be bound by theory, in the studies described in Example 1 below, the process is believed to use pyruvate oxidation metabolism (i.e. the enzyme pyruvate ferredoxin oxidoreductase) and photosynthetic machinery to generate low potential reduced redox cofactors such as ferredoxin, which may reduce mercury. It will be understood, however, that where appropriate release prevention measures are in place and/or where low-risk genetically modified bacteria are used, embodiments as described herein may also be configured to utilize genetically modified bacteria in certain examples.

As well, in certain embodiments, methods and processes described herein may be configured to take advantage of renewable energy sources such as sunlight, and/or may be designed to function across a wide range of temperatures (for example, about 25 to about 50° C.). In certain embodiments, methods and processes described herein may be configured to function in the absence of organic carbon source (using light as an energy source to drive mercury removal), although better results were obtained where simple sugars and trace nutrients were provided to support Hg removal (which, even still, was relatively cost-effective). Further, in certain embodiments, processes may be performed in the dark using fermentative microbes.

In the studies described in Examples 1 and 2 below, microbes adapted to survive without oxygen were employed, meaning such approaches may be used to treat waste or remove Hg from environments where oxygen is absent. Similarly, use of other chemicals that act as electron acceptors was not required, potentially providing a cost benefit.

Example 1—Removal of Mercury Contaminant from an Aqueous Solution Using Photoheterotrophic or Fermentative Heterotrophic Microbes Examples of removing mercury contaminant from an aqueous solution using photoheterotrophic or fermentative heterotrophic bacteria of the order Clostridiales is described in further detail below with reference to FIGS. 1-13.

In the following study, a reductive Hg metabolism is revealed in a representative of the family Heliobacteria (*Heliobacterium modesticaldum* Ice1), which is further investigated in model chemotrophic anaerobes. Heliobacteria served as the initial model in these studies because they are a family of spore-forming photoheterotrophs commonly isolated from terrestrial environments. In these studies, it was observed that *H. modesticaldum* reduced up to 75% of Hg(II) under phototrophic or fermentative conditions. In these studies, fermentative Hg(II) reduction relied on the ability of cells to oxidize pyruvate, whereas phototrophic HgII reduction may be supported even in the absence of a carbon source. Inhibiting pyruvate fermentation eliminated Hg(II) reduction in all chemotrophic strains tested, whereas phototrophic cells remained substantially unaffected. Without wishing to be bound by theory, a non mer-operon dependent mechanism is proposed for $Hg^0$ production in anoxic environments devoid of light where external electron acceptors are limited. These results indicate, in particular, bioremediation strategies for limiting the negative impacts of Hg pollution.

Hg redox transformations control Hg's fate and may limit Hg availability by reducing $Hg^{II}$ to $Hg^0$ that readily evades to the atmosphere[1]. In spite of $Hg^0$ being a dominant chemical species in anoxic environments[14,15], $Hg^{II}$ reduction pathways have previously been poorly characterized in the art. Anoxic $Hg^{II}$ reduction may occur abiotically via redox reactions with iron-bearing minerals[16,17] and dissolved organic matter[18]. Biological pathways catalyzed by dissimilatory metal reducing bacteria[19,20] and anoxygenic photosynthetic purple non-sulfur bacteria (PNSB) may also contribute to anaerobic $Hg^{II}$ reduction[21]. Strikingly, very few studies report functional mer-operon determinants (genes encoding enzymes for Hg scavenging, transport and reduction) in obligate anaerobes[22] and only homologues to the mercuric reductase MerA (encoded by merA) have been reported in the genome of an oxygenic phototroph[23].

The recent finding that PNSB couple $Hg^{II}$ reduction to maintaining redox homeostasis (i.e., the recycling of redox cofactors) during photoheterotrophic growth[21] suggested to the present inventors that these types of pathways may be widespread among other anaerobes. PNSB, which can derive energy from light and the oxidation of organic carbon, recycle the pool of redox cofactors by reducing exogenous electron acceptors (e.g., DMSO and $CO_2$)[24]. Chemotrophs such as fermenters rely on similar strategies (e.g., reduction of protons, the fixation of nitrogen gas) or the use of endogenous organic electron acceptors to maintain an optimal ratio of redox cofactors. Fermentation often co-occurs with sulfate reduction in Hg methylation hotspots[25] and some fermenters have been identified as Hg methylators[4]. Yet, whether fermentation can lead to $Hg^{II}$ reduction has been substantially untested in the art. Better understanding the potential contribution of anaerobic metabolism to Hg redox cycling is important, as it may directly impact the availability of inorganic Hg substrate for methylation in anoxic environments.[12,13]

In the following studies, the first objective was to elucidate the mechanism for Hg redox cycling using a model organism from the Heliobacteria family (order Clostridiales), a family characterized as metabolically versatile terrestrial spore forming photoheterotrophs. A model Heliobacteria was elected to work with, because many representatives from this family have been isolated from rice paddies and contribute to their ecology.[26-28] As part of these studies, whether *Heliobacterium modesticaldum* Ice1, one of the best studied members of the Heliobacteria and for which there exists a sequenced genome, can reduce $Hg^{II}$ during photoheterotrophic growth was tested. *H. modesticaldum* can also grow fermentatively in the dark.[29] A second objective of these studies was therefore to test whether $Hg^{II}$ reduction may also occur during fermentative growth providing a means for Hg redox cycling in anoxic systems devoid of light and terminal electron acceptors. The potential of *H. modesticaldum* to produce $Hg^0$ was also compared to that of other obligate chemotrophic anaerobes: *Clostridium acetobutylicum* ATCC 824 (a known fermenter with untested $Hg^0$ production ability)[30] and *Geobacter sulfurreducens* PCA (a strain growing via anaerobic respiration[31] known to produce $Hg^0$)[19,20] in an effort to expand understanding of $Hg^{II}$ reduction for different anaerobic metabolisms.

In this study, by manipulating growth conditions and using specific metabolic inhibitors, evidence of fermentative $Hg^0$ production is provided, and its importance in the context of Hg cycling in anoxic environments is discussed.

Materials and Methods

Strains, Culture Conditions, and Hg Growth Assays.

All manipulations with cell cultures were performed under anaerobic conditions by working in a Coy anaerobic glovebox under 98% $N_2$/2% $H_2$ atmosphere or by using sterile anaerobic technique on a benchtop where equipment was sparged with $N_2$ gas prior to use. All obligate anaerobe strains were revived in the anaerobic glovebox from cryostocks kept at −80° C. Tubes were then crimped shut and had their headspace replaced with 100% $N_2$.

The following strains were used in these studies: *Heliobacterium modesticaldum* Ice1, *Clostridium acetobutylicum* ATCC 824, *Geobacter sulfurreducens* PCA and *Escherichia coli* K-12. For phototrophic growth of *H. modesticaldum*, cells were supplied with constant illumination at 80 $\mu mol_{photon} \cdot m^{-2} \cdot s^{-1}$ at 50° C. whereas chemotrophic cells were grown at the same temperature in the dark in line with previous work.[32] *C. acetobutylicum* and *E. coli* were grown at 37° C. whereas *G. sulfurreducens* was grown at 28° C., all chemotrophically in the dark. Details on the growth media and environmental conditions supplied are provided in Table 1.

TABLE 1

Summary of Growth Conditions in Bioreactor Experiments

| | | Growth conditions | | | Exposure conditions in bioreactor | | |
|---|---|---|---|---|---|---|---|
| Strain | Metabolism | T (° C.) | Carbon source(s) (mM or g/L$^{-1}$) | e-sink (mM) | T (° C.) | Carbon source(s) (mM or g/L$^{-1}$) | e-sink/inhib. treatment (μM or mM) |
| *Heliobacterium modesticaldum* Ice1 | Phototrophy | 50 | Pyruvate (20 mM) + YE (4 g/L$^{-1}$) | NA | 50 | Pyruvate (20 mM) + YE (4 g/L$^{-1}$) | NA |
| | | | | | | | NTZ (10 μM) + DMSO (2.8 mM) |
| | | | | | | | DMSO (2.8 mM) |
| | | | | | | No carbon | NA |
| | | | Acetate (30 mM) + YE (4 g/L$^{-1}$) | | | Acetate (30 mM) + YE (4 g/L$^{-1}$) | NA |
| | | | | | | Acetate (30 mM) + YE (4 g/L$^{-1}$) | HCO$_2^-$ (10 mM) |
| | | | YE (4 g/L$^{-1}$) | | | YE (4 g/L$^{-1}$) | NA |
| | Chemotrophy | 50 | Pyruvate (20 mM) + YE (4 g/L$^{-1}$) | | 50 | Pyruvate (20 mM) + YE (4 g/L$^{-1}$) | NA |
| | | | | | | | NTZ (10 μM) + DMSO (2.8 mM) |
| | | | | | | | DMSO (2.8 mM) |
| | | | | | | No Carbon | NA |
| | | | | | | YE (4 g/L$^{-1}$) | NA |
| | | | | | | YE (0.2 g/L$^{-1}$) | NA |
| | | | | | | Acetate (30 mM) | NA |
| | | | | | | Pyruvate (100 mM) | NA |
| | | | | | | Pyruvate (20 mM) | NA |
| | | | | | | Pyruvate (2 mM) | NA |
| | | | | | | | NO$_2^-$ (10 μM) |
| *Clostirdium acetobutylicum* ATCC 824 | Chemotrophy | 37 | Glucose (28 mM) + Peptone (10 g/L$^{-1}$) + YE (10 g/L$^{-1}$) | NA | 37 | Pyruvate (20 mM) + YE (4 g/L$^{-1}$) | NA |
| | | | | | | | NTZ (10 μM) + DMSO (2.8 mM) |
| | | | | | | | DMSO (2.8 mM) |
| | | | | | | Glucose (28 mM) + Peptone (10 g/L$^{-1}$) + YE (10 g/L$^{-1}$)$^a$ | NA |
| *Geobacter sulfurreducens* PCA | Chemotrophy | 28 | Acetate (10 mM) | Fumarate (20 mM) | 28 | Pyruvate (20 mM) + YE (4 g/L$^{-1}$) | NA |
| | | | | | | | NTZ (10 μM) + DMSO (2.8 mM) |
| | | | | | | | DMSO (2.8 mM) |
| | | | | | | | Fumarate (40 mM) |
| | | | | | | Acetate (10 mM)a | Fumarate (40 mM) |
| *Escherischia coli* K-12 | Chemotrophy | 37 | Pyruvate (20 mM) + YE (4 g/L$^{-1}$) | NA | 37 | Pyruvate (20 mM) + YE (4 g/L$^{-1}$) | NA |

Abbreviations:
yeast extract = YE,
electron = e-,
*C. acetobutylicum* and *G. sulfurreducens* were supplied with Hg in PYE where SO$_4^{2-}$ salts were replaced with chloride salts (referred to in the manuscript as PYEΔSO$_4^{2-}$)
$^a$These medium recipes represent the optimal growth medium used to study additional model anaerobes referred to in the main body of text.

All bioreactor assays were performed at a final [Hg]=250 pM. Selected assays testing for Hg$^{II}$ possibly acting as an electron sink and thus enabling growth were carried out at [Hg]=500 nM. Hg growth assays were carried out under the same phototrophic and chemotrophic conditions mentioned above.

Additional information on cell culturing protocols and preparation of reagents are as follows:

Stock solutions used in cell cultures were all prepared following anaerobic techniques. Nitazoxanide (NTZ) stocks were prepared to a final concentration of 10 μM in pure DMSO sparged with N$_2$ and stored at 4° C. in the dark. For DMSO controls, the DMSO solution was bubbled with N$_2$ prior to being added to the bioreactor; final concentration of DMSO in the reactor was 2.8 mM. Sodium nitrite stocks were prepared to a final concentration of 10 mM in ultra pure miliQ, filter-sterilized, sparged with N$_2$ and stored at 4° C. in the dark; final concentration of NO$_2^-$ in the reactor was 10 μM. For experiments where HCO$_3^-$ was supplied, a stock solution of 1 M was prepared by dissolving NaHCO$_3$ in ultra pure MiliQ and autoclaving for 30 minutes at 121° C. under 80% N$_2$/20% CO$_2$ atmosphere prior to use. Fumarate stock solutions were prepared at a final concentration of 40 mM in ultra pure miliQ, filter sterilized (0.2 μm pore size), bubbled with N$_2$, sealed and crimped shut in sterile serum bottles prior to use. All equipment used in the anaerobic glove box was conditioned for at least 48 hours prior to use.

For *Heliobacterium modesticaldum* Ice1, new cultures were started from a cryostock for every bioreactor experiment. Cells were revived in DSMZ medium 655 (herein referred to as PYE) previously used to isolate *H. modesticaldum* (Kimble, L. K.; Mandelco, L.; Woese, C. R.; Madigan, M. T., *Heliobacterium modesticaldum*, sp. nov., a thermophilic *heliobacterium* of hot springs and volcanic soils. Archives of Microbiology 1995, 163, (4), 259-267). Cultures started from cryostock were grown phototrophically in PYE with an incandescent light source and constant illumination of 80 μmol photon m$^{-2}$s$^{-1}$ at 50° C. in line with previous work (Kimble, above) until reaching early stationary phase. Afterwards, a 10% inoculum was used to re-inoculate 10 mL of fresh PYE and cells were grown phototrophically (with the same light intensity) or chemotrophically (in the dark) at 50° C. These cultures were used to establish finely resolved growth curves and Hg growth assays (see FIGS. 1 and 2).

For experiments testing the effect of carbon source on Hg$^0$ production some modifications to the initial PYE medium growth protocol were made. Phototrophic *H. modesticaldum* cells were grown with pyruvate, acetate, acetate+HCO3$^-$ and/or yeast extract alone as a carbon source. Cells were grown until late exponential phase before being subsampled to supply a 10% inoculum for cultures with a final volume 75 mL destined for the bioreactor and grown under the same conditions (see Table 1). Chemotrophic cells were grown exclusively in PYE because no other carbon source supported chemotrophic growth. Upon reaching late exponential phase, cells were inoculated into the bioreactor as a 10% inoculum in a final volume of 560 mL of media with the desired carbon source treatment.

For *Clostridium acetobutylicum* ATCC 824, new cultures were started for every bioreactor experiment. Cells were revived in DSMZ medium 104b (herein referred to as PYX). Cells were grown in the dark at 37° C. until reaching early stationary phase after which point they were rotated as a 1% inoculum in a final volume of 10 mL into fresh PYX. Cells were grown to late exponential phase, and re-inoculated as a 1% inoculum in a final volume of 75 mL of PYX in cultures destined for the bioreactor. Experiments were performed in PYE where all $SO_4^{2-}$ salts were substituted with chloride salts ($PYE\Delta SO_4^{2-}$) to avoid competition between $Hg^{II}$ reduction and $SO_4^{2-}$ reduction. Cells were also supplied with $Hg^{II}$ in DSMZ medium 104b to account for the effect of suboptimal growth medium (see Table 1 and Table 3). Cells achieved extremely high densities as such a 1-2% inoculum, rather than 10%, was chosen for the bioreactor experiment to ensure initial cell densities were comparable amongst strains for the NTZ and/or DMSO experiments. The initial volume of medium in the bioreactor was corrected to ensure that identical volumes were maintained throughout all experiments.

*Geobacter sulfurreducens* PCA cells were revived from cryostock and grown in defined medium (herein referred to as GSMM) according to previous work (Schaefer, J. K.; Morel, F. M. M., High methylation rates of mercury bound to cysteine by *Geobacter sulfurreducens*. Nature Geoscience 2009, 2, (2), 123-126) with the following modification: resazurin, the color indicator used to monitor anoxia, was removed to avoid issues with abiotic Hg reduction given that resazurin is a reducing agent. Cells were grown chemotrophically in the dark at 28° C. Cells took between 10 to 12 days to re-initiate growth, as such, cultures were maintained by re-inoculating fresh GSMM every 4 days with a 10% inoculum in a final volume of 10 mL. Upon reaching late exponential phase, a 10% inoculum was used to start cultures in GSMM with a final volume of 75 mL destined for the bioreactor. Upon reaching late exponential phase a 10% inoculum was used to inoculate the bioreactor where cells were supplied with $Hg^{II}$ in 560 mL of $PYE\Delta SO_4^{2-}$ or GSMM medium (see Table 1).

*Escherichia coli* K-12 cultures were plated aerobically from cryostock onto LB medium and grown at 37° C. overnight. A single colony was used to inoculate PYE medium and incubated at 37° C. under 100% $N_2$ headspace for 24 hours before a 1% inoculum was used to re-inoculate 75 mL of fresh PYE medium. These cultures were incubated at 37° C. under 100% $N_2$ headspace for 24 hours and a 10% inoculum was used to inoculate a final volume of 560 mL of PYE medium in the bioreactor.

Bioreactor Setup and Elemental Hg Measurements.

Please refer to the methods section of Gregoire and Poulain (2016)[21] (which is herein incorporated by reference in its entirety) for a schematic of the bioreactor setup employed and the $Hg^0$ sampling methodology. Note that phototrophic bioreactor experiments were carried out using a 200 W incandescent clear light bulb at a constant illumination at 20 $\mu mol_{photon} \cdot m^{-2} \cdot s^{-1}$. The modifications to this method are the growth conditions supplied in the bioreactor that are summarized in the previous section Strains, Culture Conditions and Hg Growth Assays, and Table 1.

Each single bioreactor experiment required 1 week to be fully completed, with little overlap allowed between experiments as a single continuous $Hg^0$ analyzer (Tekran 2537) was relied on. A total of 53 bioreactor experiments were performed to support these studies. The details of replicated experiments and associated metadata are presented in Table 3.

Bioreactor Subsampling for Total Hg Mass Balance and Cell Density.

Figure 2:
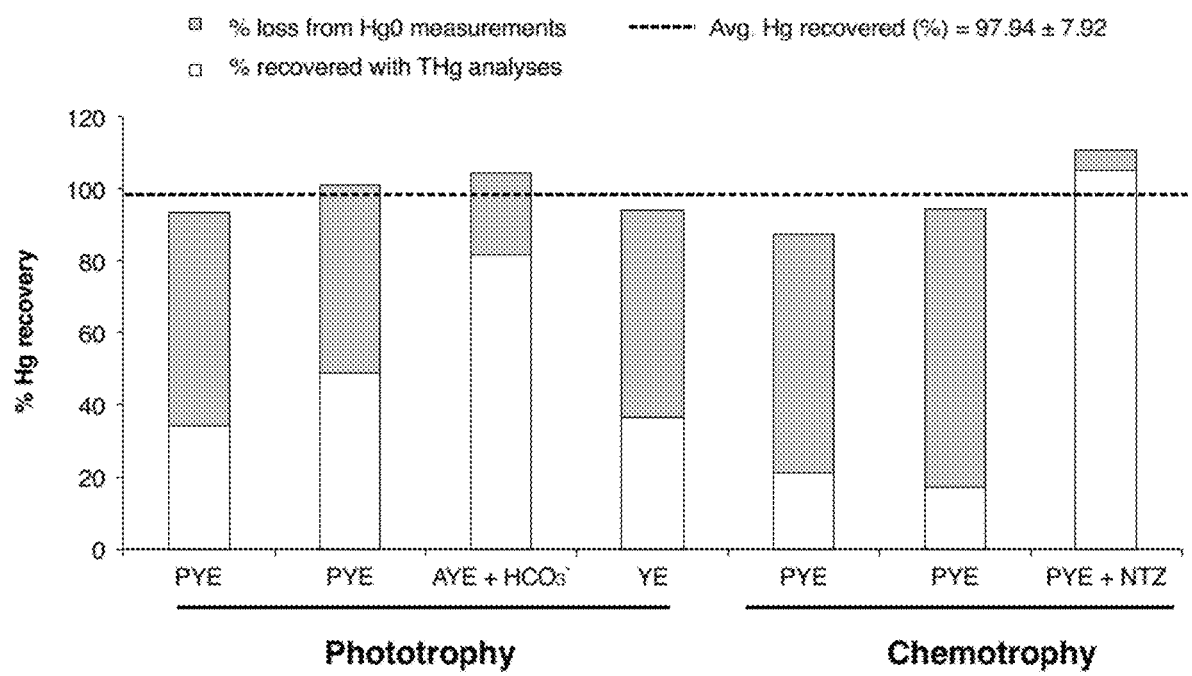
FIG. 2 shows percent total Hg recovered for select experiments with live *Heliobacterium modesticaldum* Ice1 grown phototrophically and chemotrophically in PYE. The average and standard deviation for percentage of Hg recovered is based on a sample size of n=7.
Figure 3:
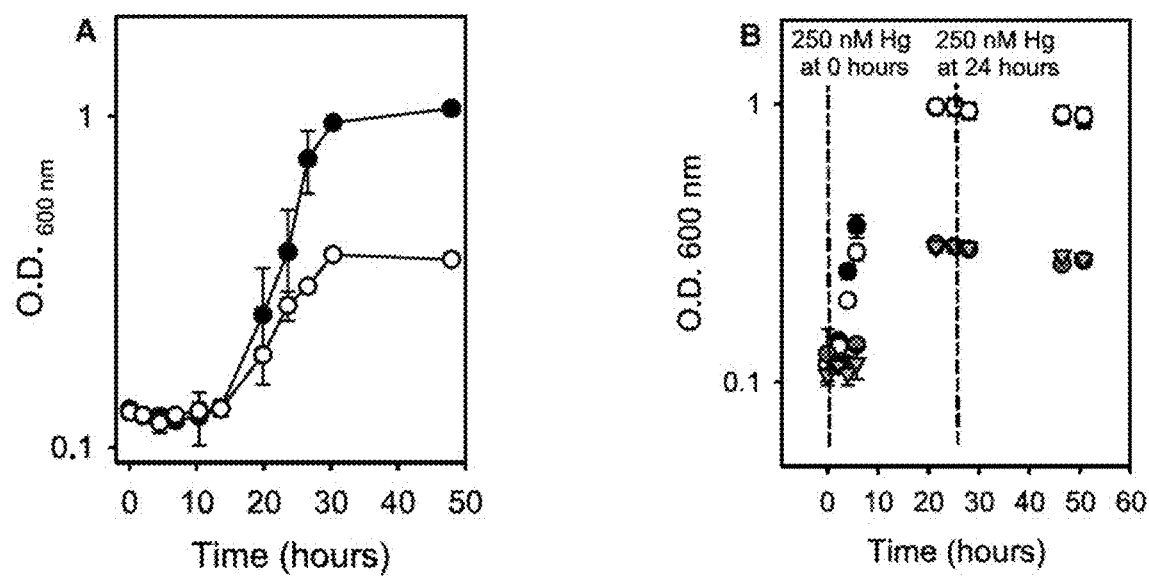
FIG. 3 shows growth curves for *Heliobacterium modesticaldum* Ice1 grown phototrophically and chemotrophically with and without repeated spikes of Hg. A, B growth curve for cells grown phototrophically and chemotrophically in the absence of Hg (A) and in the presence of 500 nM $HgCl_2$ supplied as two doses of 250 nM 24 hours apart (B). Data points are the average of n=3 replicates and error bars represent standard deviations. In (A), black circles (-•-)=Phototrophic *H. modesticaldum* in PYE and white circles (-○-)=Chemotrophic *H. modesticaldum* in PYE. In (B), black circles (●)=Phototrophic cells in PYE 0 nM Hg, white circles (○)=Phototrophic cells in PYE 500 nM Hg, blue circles (◉)=Chemotrophic cells in PYE 0 nM Hg, and yellow triangles (▽)=Chemotrophic cells in PYE 500 nM Hg.

Total Hg analyses in solution were performed using EPA method 1631. Total Hg mass balance and bioreactor subsampling were performed following the methodology from Gregoiré and Poulain (2016)[21] with the following modification: cell growth was monitored via changes in O.D. 600 nm. Mass balance experiments were performed and total Hg amounts (FIG. 1) and recoveries (FIG. 2) were measured for experiments with *H. modesticaldum* to corroborate Hg measurements. The average quantity of Hg recovered at the end of the experiment was 170.12±18.92 µmol and the average quantity measured at the beginning of the experiments was 177.18±12.84 µmol (FIG. 1). The average percent Hg recovered was 97.94±7.92% (FIG. 2).

HPLC Measurements of Pyruvate and Acetate.

*H. modesticaldum* cultures grown chemotrophically in PYE with 0.2 $g \cdot L^{-1}$ yeast extract were employed to measure pyruvate consumption and acetate production. Compounds were detected using high performance liquid chromatography coupled with a photodiode array detector (HPLC-DAD). Additional details on the HPLC setup are as follows:

Separation of compounds was achieved on a Synergy Polar column (150 mm×2.1 mm I.D., 1.7 µm particle size, Phenomenex, Torrance, Calif., USA). The mobile phase consisted of 0.1% formic acid in water (Fisher optima LCMS). Quantification was performed based on the peak area in each sample analyzed compared to the peak areas of known concentrations of each compound in the calibration curve. The setup was comprised of on an Agilent 1100 series system that had a quaternary pump, a 100 uL built in sampling loop, a column thermostat and a photo diode array detector. The optimized sample analysis conditions were as follows: the column thermostat was set 65° C., flow rate was 0.2 mL min-1, mobile phase delivery was isocratic, the emission spectra used to detect each compound with the photodiode array detector was measured at 210 nm using the emission at 380 nm as reference, finally, 2 µL of each sample was injected. Chemstation B.03.02 software was used to acquire and analyze the data. Calibration curves for each compound were made using sodium pyruvate from Fisher scientific (BP356-100, purity 99%) and sodium acetate from Sigma-Aldrich (S5636-500 g, purity 990) dissolved in 0.1% formic acid.

Statistical Analysis.

Statistical information is provided in the Brief Description of the Drawings section. Additional details on the statistical tests employed are provided below. The software package used for comparison of means was R v 3.4.2 and the software package used for fitting nonlinear regressions was Sigmaplot™ v 12.5.

One-way ANOVAs were performed for phototrophic and chemotrophic Hg exposure assays using R statistical software (R Core Team R: A Language and Environment for Statistical Computing, R Foundation for Statistical Computing: 2014). In the event of detecting a significant difference, assumptions of constant variance and normality were verified with the Brusch-Pagan test and the Shapiro-Wilks test, respectively, with the significance thresholds set to p=0.05 for each test. Significant differences were then identified using the Tukey HSD test. The sample size employed for growth assays was n=3 per treatment. All assumptions were passed for significant differences and these values are reported in the Brief Description of the Drawings (see FIG. 4). A non-linear regression model was fit to the cumulative $Hg^0$ production data as a function of pyruvate concentration using Sigmaplot software. In this instance, a natural logarithmic function was fit to a data set of n=8. Given the significant fit, assumptions of constant variance and normality were verified with the Sigmaplot software with the significant threshold set to p=0.05 for each test. All assumptions were passed and these values are reported in the figure legends (see FIG. 3).

Results and Discussion $Hg^0$ Production Occurs Phototrophically and Chemotrophically.

To test whether *H. modesticaldum* reduced $Hg^{II}$ by using it as an electron acceptor during photoheterotrophic growth, biotic and abiotic $Hg^0$ production was compared under phototrophic and chemotrophic (fermentative) growth conditions (Table 3). It was predicted that more $Hg^0$ would be produced when *H. modesticaldum* was grown phototrophically compared to cells grown chemotrophically because PNSB only reduced Hg phototrophically.[21]

Figure 5:
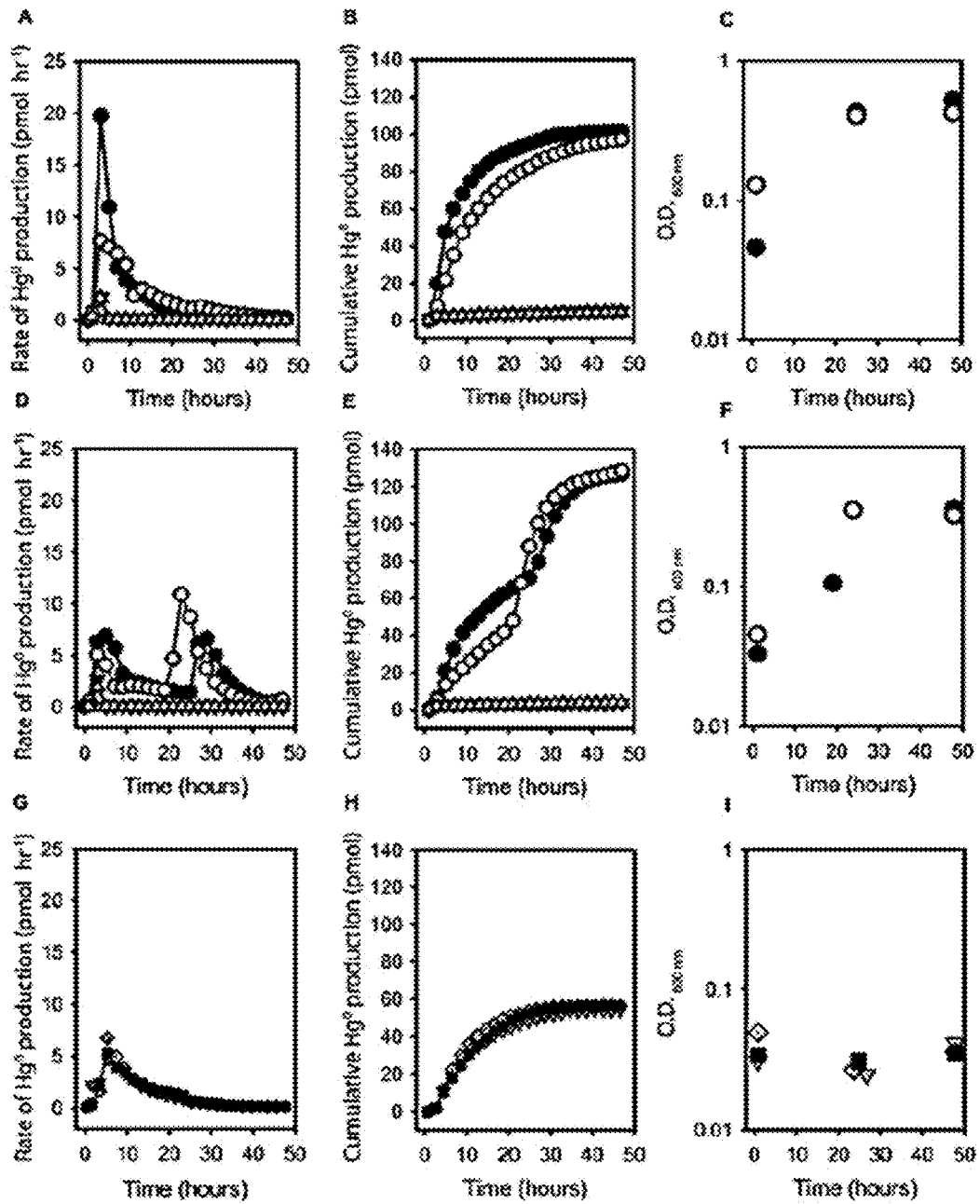
FIG. 5 shows $Hg^0$ production by *Heliobacterium modesticaldum* Ice1 grown phototrophically and chemotrophically. A,D,G Rate of $Hg^0$ production for live cells, autoclaved cells and sterile medium under phototrophic (A) and chemotrophic (D) condition and live cells supplied with pyruvate or pyruvate and trace amounts of yeast extract under chemotrophic conditions (G). B, E, H Cumulative $Hg^0$ production for live cells, autoclaved cells and sterile medium under phototrophic (B) and chemotrophic (E) conditions and live cells supplied with pyruvate or pyruvate and trace amounts of yeast extract under chemotrophic conditions (H). C, F, I Microbial growth as measured by O.D. 600 nm for phototrophic (C) and chemotrophic (F) conditions and live cells supplied with pyruvate or pyruvate and trace amounts of yeast extract under chemotrophic conditions (I). Hg was added to a final concentration of 250 Pm. Black circles (-●-)=Live cells (Pyruvate 20 mM; Yeast extract 4 g·$L^{-1}$) replicate #1; white circles (-○-)=Live cells (Pyruvate 20 mM; Yeast extract 4 g·$L^{-1}$) replicate #2; black triangles (-▼-)=Autoclaved cells (Pyruvate 20 mM; Yeast extract 4 g·$L^{-1}$); white triangles (-△-)=Sterile medium (Pyruvate 20 mM; Yeast extract 4 g·$L^{-1}$); hollow triangles (-∇-)=Live cells (Pyruvate 20 mM; Yeast extract 0.2 g·$L^{-1}$); hollow circles (-○-)=Live cells (Pyruvate 20 mM) replicate #1; squares (-■-)=Live cells (Pyruvate 20 mM) replicate #2.

Contrary to these predictions, 15% more $H^0$ produced during chemotrophic vs phototrophic growth (FIG. 5 and Table 3) was repeatedly observed. Autoclaved and sterile medium treatments produced 95% less $Hg^0$ (<6 µmol) than live cells, regardless of the conditions supplied (FIG. 5 and Table 3). $Hg^0$ production by phototrophic cells showed a single peak early on in the experiment (FIG. 5A). In contrast, chemotrophic cells produced two distinct peaks 20-24 h apart (FIG. 5D) with the second peak occurring in late exponential phase (FIG. 5D and FIG. 3A). These findings suggested that time was required for cells to reoxidize some yet unidentified intracellular redox active cofactor, possibly through growth, before $Hg^{II}$ reduction could resume.

To possibly explain the occurrence of the second peak and link its presence to cell growth, a series of experiments were performed where cells were supplied with increasing concentrations of yeast extract (YE) in the presence of 20 mM pyruvate. Indeed, *H. modesticaldum* could not grow on pyruvate alone and the addition of YE was necessary for growth (FIGS. 5F and I). The addition of trace amounts of YE (0.2 g·L$^{-1}$) did not enable growth and did not enhance $Hg^{II}$ reduction beyond what was observed for pyruvate alone (FIGS. 5H and I). It was only when YE was provided at a concentration of 4 g·L$^{-1}$ that growth was observed, the second peak occurred and $Hg^{II}$ reduction more than doubled reaching 124.46±6.43 µmol (FIG. 5 and Table 3) which amounts to 75% of the $Hg^{II}$ being converted into $Hg^0$ (FIGS. 1 and 2). These results show that Hg reduction is not solely driven by light reactions in *H. modesticaldum*. Without wishing to be bound by theory, it is hypothesized that under chemotrophic conditions the ability of cells to recycle the pool of redox cofactors through growth leads to optimal $Hg^{II}$ reduction. That the second peak observed for $Hg^0$ results from a different mechanism cannot be excluded, however.

Figure 4:
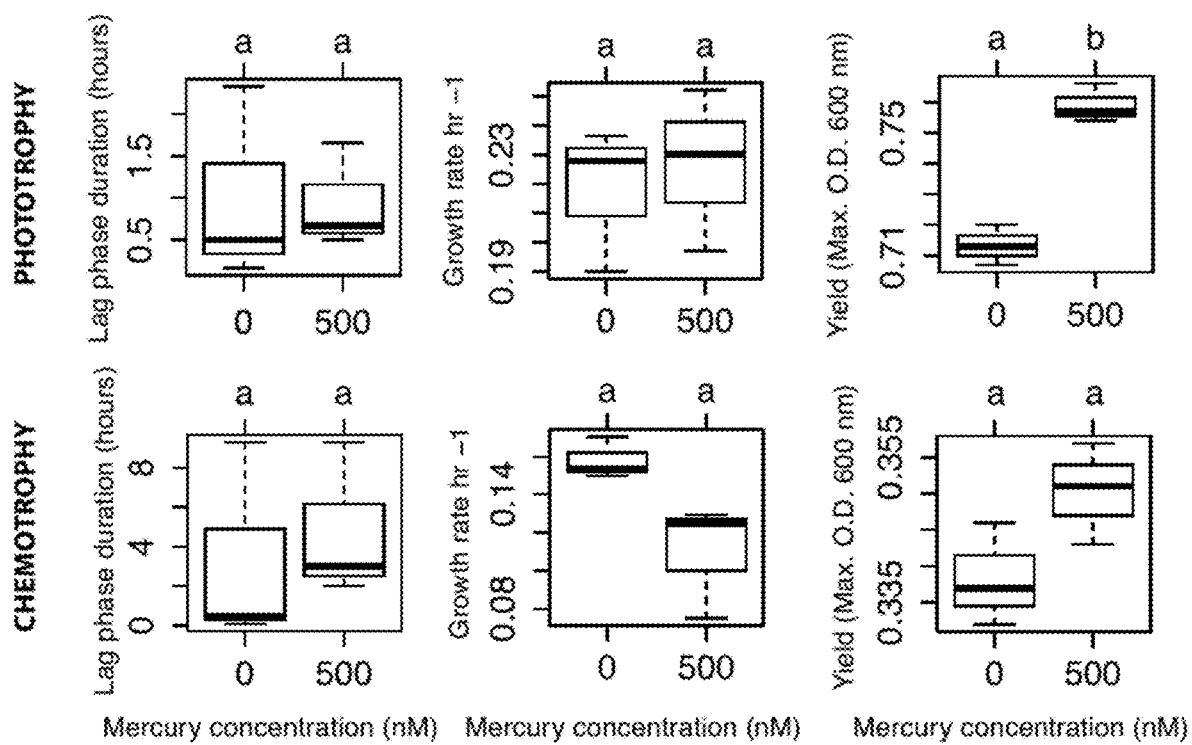
FIG. 4 shows growth parameters for *Heliobacterium modesticaldum* Ice1 cells grown phototrophically (top panels) and chemotrophically (bottom panels) in the presence of 500 nM $HgCl_2$. The bottom and top of the boxes show the first and third quartiles, respectively, the bar in the middle shows the median and the whiskers show the minimum and maximum for each treatment, all of which had a sample size of n=3. [Hg] had a significant effect (p<0.05) on yield for phototrophically grown cells (p=0.0009). Tests for constant variance and normal distribution for phototrophic yield were passed (significance threshold for rejection of null hypothesis p=0.05) with p=0.88 and p=0.29, respectively. Letters not shared between treatments indicate a significant (p<0.05) difference according to the Tukey HSD test.

As previously proposed for PNSB[21], it was also tested whether *H. modesticaldum* was able to derive a physiological advantage when supplied with sublethal amounts of $Hg^{II}$ by using it as an electron sink to recycle the pool of reduced cofactors. No physiological advantage was observed except for a small increase in the yield of phototrophically grown cells in the presence of sublethal amounts of Hg (FIG. 3B and FIG. 4).

Pyruvate Oxidation Contributes to Dark $Hg^{II}$ Reduction.

To the best of our knowledge, no previous studies have reported on a mechanism for Hg reduction by Heliobacteria or a model fermentative bacterium. This is surprising given the importance of fermentation in nutrient cycling in anoxic environments. To elucidate the mechanism, studies were focused on narrowing down the potential metabolic coupling points involved in $Hg^{II}$ reduction by varying the supply of organic carbon under chemotrophic conditions. It was hypothesized that chemotrophic $Hg^{II}$ reduction is dependent on the ability of cells to generate reducing power while growing fermentatively.

To test this hypothesis, $Hg^0$ production for cells provided with non-fermentable carbon sources to cells provided with a fermentable carbon source was compared. The nonfermentable carbon source treatments were YE alone, acetate alone or a no carbon control; the fermentable carbon source was pyruvate[29] (Table 1). Cells provided with nonfermentable carbon sources exhibited up to an 80% decrease in $Hg^0$ production (<15 µmol, FIG. 6) compared to cells supplied with pyruvate (59.51±0.83 µmol, FIG. 6) or pyruvate+YE (124.46±6.43 µmol, FIG. 6). These results suggest that chemotrophic $Hg^{II}$ reduction is dependent on a substrate that supports fermentation and that pyruvate metabolism is one notable component of chemotrophic $Hg^{II}$ reduction in *H. modesticaldum*.

To test for the importance of pyruvate metabolism in Hg redox cycling we focused on the core metabolic role of the reversible enzyme pyruvate:ferredoxin oxidoreductase (PFOR), an essential enzyme used to generate reducing power for biosynthesis and metabolize carbon substrate used in fermentative ATP production.[33] PFOR reversibly catalyzes the conversion of pyruvate to acetyl-CoA and transfers electrons to the redox cofactor ferredoxin when operating in the oxidative direction. This reaction acts as the primary source of reducing power in *H. modesticaldum*.[29,33] Acetyl-CoA can be converted to acetyl-phosphate and acetate is generated as a byproduct of energy conservation through ATP synthesis.[29] *H. modesticaldum* can only use acetate as a carbon source during phototrophic growth.[29,32]

Based on this metabolic restriction, it was tested whether $Hg^0$ production in the dark is dependent on the availability of pyruvate, the oxidation of which is directly tied to generating reducing power via PFOR.[29] It was predicted that $Hg^0$ production would increase as a function of pyruvate concentration.

Figure 6:
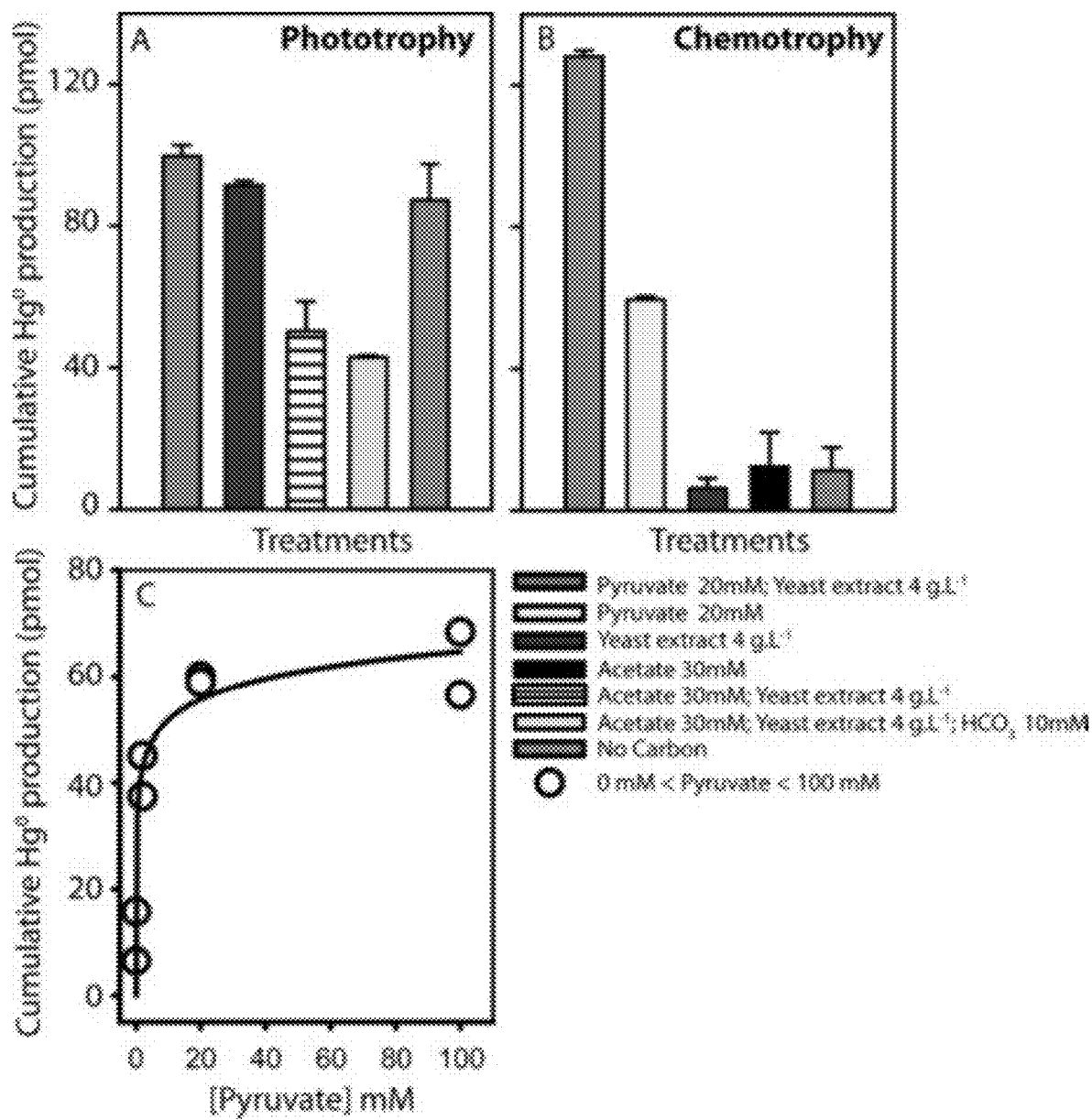
FIG. 6 shows A and B: Cumulative $Hg^0$ production by *Heliobacterium modesticaldum* Ice1 grown phototrophically and chemotrophically with different carbon sources. Results shown here are the average of repeated experiments (n=2) and error bars represent the standard deviation. Note that the Acetate (30 mM) treatment was only performed for chemotrophically grown cells and the Acetate (30 mM)+YE (4 g·$L^{-1}$) and Acetate (30 mM)+YE (4 g·$L^{-1}$)+$HCO_3^-$ (10 mM) were only performed for phototrophically grown cells. Hg was added to a final concentration of 250 pM. C: Cumulative $Hg^0$ production for chemotrophically grown *Heliobacterium modesticaldum* Ice1 over a pyruvate gradient (0, 2, 20, and 100 mM). Cumulative $Hg^0$ production increased significantly (p<0.05) according to the nonlinear function y=39.975+5.589 ln(x) where p=0.0007 and the adjusted $R^2$=0.85 for a data series of n=8. Tests for constant variance and normal distribution were passed (significance threshold for rejection of null hypothesis p=0.05) with p=0.50 and p=0.53, respectively. Hg was added to a final concentration of 250 pM.
Figure 7:
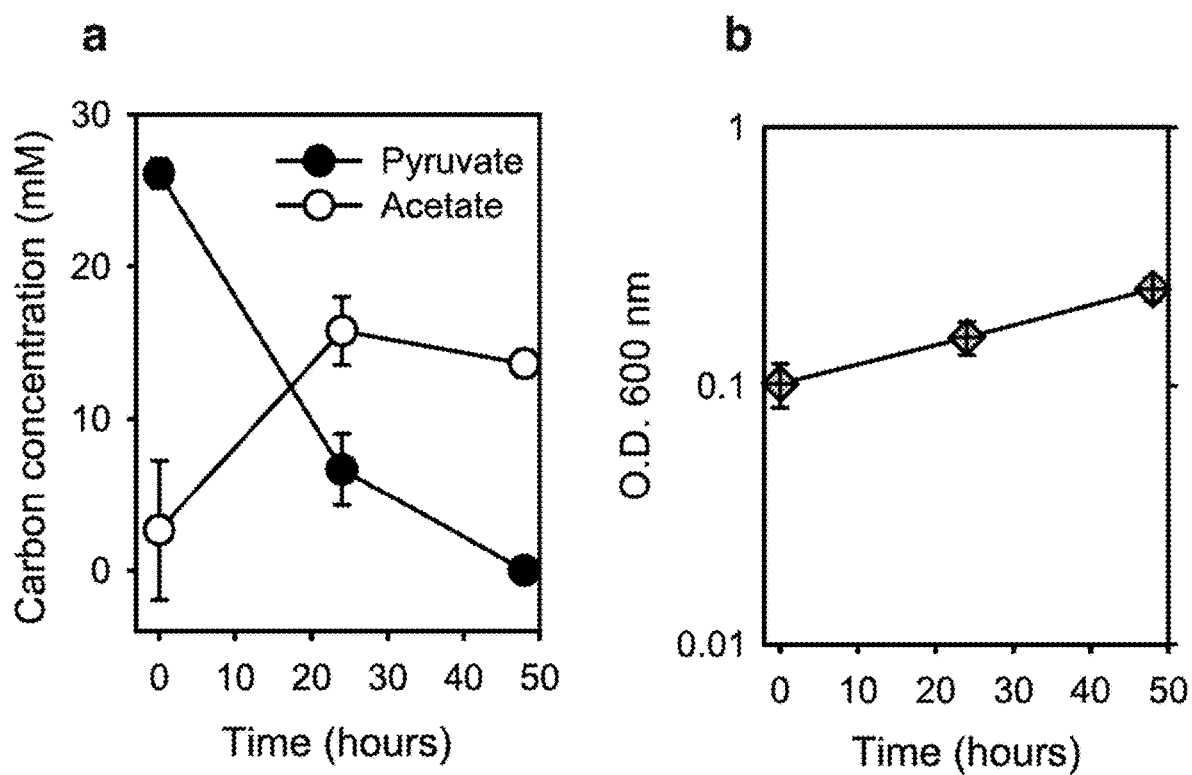
FIG. 7 shows pyruvate and acetate concentrations for *Heliobacterium modesticaldum* Ice1 grown chemotrophically in PYE medium with 0.2 g $L^{-1}$ yeast extract. A, B Pyruvate and acetate concentrations as measured by HPLC (A) and microbial growth (B). Data points are the average of n=3 and error bars represent standard deviations.

It was first confirmed that the reaction catalyzed by PFOR was carried out under the chemotrophic conditions tested. It was observed that pyruvate was rapidly consumed over the time frame of the experiment with ca. 50% being excreted as acetate similar to what has been reported in previous studies[29] (FIG. 7). Under these conditions, it is shown that $Hg^0$ production increased as a function of pyruvate concentration although the total amount of $Hg^0$ produced reached a plateau between 20 and 100 mM pyruvate (FIG. 6C).

These results support that chemotrophic $Hg^0$ production was dependent on pyruvate oxidation for the initial supply of reducing power. However, it is hypothesized that cells eventually became limited in their ability to reduce $Hg^{II}$ even when supplied with ample pyruvate under the conditions tested. It is hypothesized that this may be attributed to the presence of a plateau to the inability of cells to recycle the intracellular pool of redox cofactors via growth. Indeed, *H. modesticaldum* was unable to grow on pyruvate in the absence of YE (FIG. 5I and previous section). These results support that organic carbon oxidation provided reducing power for $Hg^{II}$ reduction during fermentative growth and underscore that Hg⁰ production is optimal when cells can recycle the pool of redox cofactors.

Despite growth leading to optimal $Hg^{II}$ reduction, 100% $Hg^{II}$ reduction was never observed (FIG. 2). With mM levels of pyruvate available for oxidation via PFOR, there should be ample reducing power available to reduce pM amounts of Hg. It is hypothesized that the extent of net Hg reduction may be limited by (i) cellular $Hg^{II}$ uptake, (ii) the availability of intracellular redox cofactors and (iii) the very rapid reoxidation of newly formed Hg⁰. Assuming that the Hg reduction observed here is an intracellular process, it is remarkable to observe such high levels of Hg⁰ produced in the absence of a dedicated transport system, such as those available to microbes possessing the mer-operon. Although it is hypothesized that the majority of the reducing power generated by pyruvate oxidation is being employed to maintain cellular functions, quantifying the proportion of reducing power available for Hg reduction was not performed due to the low cell density achieved in the bioreactor experiments.

*H. modesticaldum* can Catalyze Light-Dependent Reduction of $Hg^{II}$.

Figure 8:
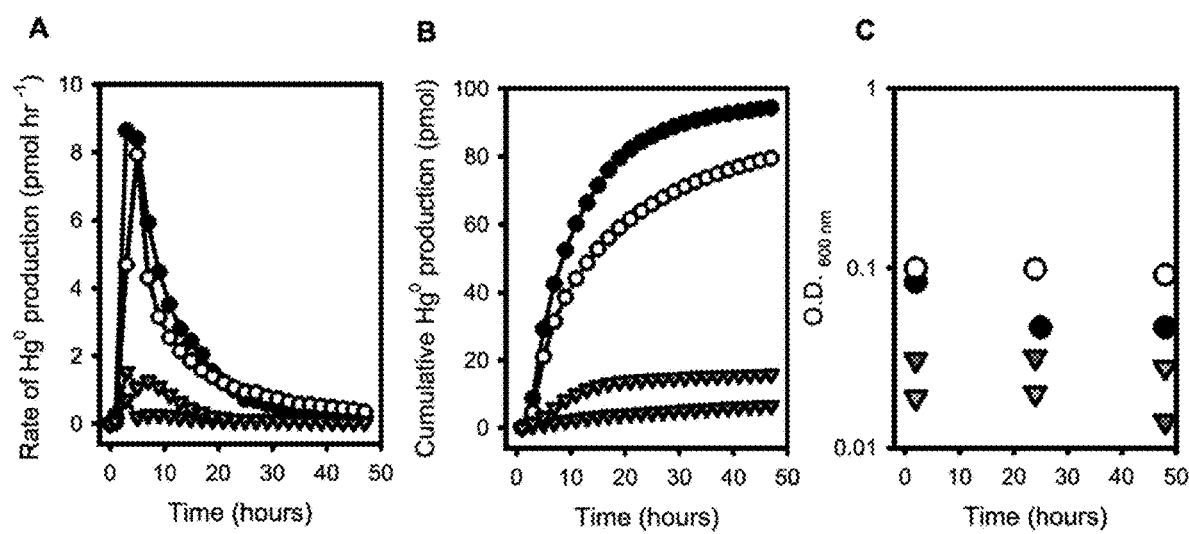
FIG. 8 shows repeated experiments measuring $Hg^0$ production by *Heliobacterium modesticaldum* Ice1 grown phototrophically and chemotrophically in the absence of organic carbon. A-C Rate of $Hg^0$ production (A), cumulative $Hg^0$ production (B) and microbial growth (C) for cells initially grown in PYE medium and supplied with $Hg^{II}$ in the absence of organic carbon. The average quantity of $HgCl_2$ present at the beginning of each assay was 177.18+12.84 μmol. Black circles (—●—)=Phototrophic cells no carbon replicate #1; white circles (—○—)=Phototrophic cells no carbon replicate #2: Blue triangles (—▼—)=Chemotrophic ells no carbon replicate #1; Yellow triangles (—▽—)=Chemotrophic cells no carbon replicate #2.

When grown phototrophically, cells rely on their photosynthetic machinery to produce ATP and reduce ferredoxin.[29] To further explore the role of reducing power availability on $Hg^{II}$ reduction it was first tested whether cells irradiated by visible light in the absence of a carbon source could trigger $Hg^{II}$ reduction. It was observed that non-growing (no carbon) irradiated *H. modesticaldum* cells produced nearly as much Hg⁰ compared to cells supplied with pyruvate and YE (87.21±10.25 μmol vs 99.79±3.11 μmol, FIG. 6 and Table 3). This result contrasts with cells kept in the dark where virtually no Hg⁰ was produced (FIG. 6, FIG. 8, and Table 3). These results suggest that photoinduced electron transfer maintains a sufficient pool of reducing power that drives $Hg^{II}$ reduction in *H. modesticaldum*. Although this evidence suggests that $Hg^{II}$ reduction depends on the availability of reduced cytoplasmic ferredoxin, it cannot be discounted that components of *H. modesticaldum*'s electron transport chain participate directly in $Hg^{II}$ reduction.

Light-Dependent $Hg^{II}$ Reduction Depends on the Availability of Redox Cofactors.

As an additional test for the role of reducing power availability in $Hg^{II}$ reduction, cells were supplied with conditions that favor the consumption of reducing power. Indeed, during phototrophic growth on acetate, PFOR is predicted to consume acetate, inorganic carbon ($HCO_3^-$) and reduced ferredoxin originating from light reactions to produce pyruvate.[33] Hg⁰ production was compared for phototrophic cells grown on YE alone, YE+acetate and YE+acetate+$HCO_3^-$ (Table 1). Under conditions that favor growth on acetate and the consumption of reduced ferredoxin, Hg⁰ production decreased by ca. 40% compared to the YE only control (52.04±8.52 μmol for YE+acetate, 42.91±0.57 μmol for YE+acetate+$HCO_3^-$ v.s. 91.38±1.26 μmol for YE, FIG. 6 and Table 3).

These results show that Hg⁰ production was enhanced when cells chemotrophically oxidize pyruvate but is inhibited when cells phototrophically consume acetate. These findings suggest that $Hg^{II}$ reduction is linked to the activity of enzymes that depend on the availability of redox cofactors.

Inhibiting Key Fermentation Enzymes Affects Hg0 Production.

The next objective was to distinguish the role of a direct involvement of PFOR to that of reduced ferredoxin in Hg reduction. First, PFOR activity was inhibited for phototrophically and chemotrophically grown *H. modesticaldum* cells using nitazoxanide (NTZ), a specific PFOR inhibitor that has previously been used on members of the closely related Clostridia[34] (Table 1).

Whereas PFOR is essential to maintain the pool of reducing power when cells are growing fermentatively in the dark, it is not the case in the presence of light when oxidized ferredoxin can be reduced by photobiological reactions.[29] It was predicted that if $Hg^{II}$ reduction depends on the ability of cells to generate reduced cofactors, compensatory pathways such as light-driven reduction of ferredoxin would maintain a sufficient supply of reducing equivalents for $Hg^{II}$ reduction even when PFOR was inhibited.

The presence of NTZ inhibited chemotrophic Hg⁰ production by 88% compared to controls (7.14±3.83 pmol for cells supplied with NTZ (74.00+16.99 μmol v.s. 82.29±1.50 μmol) (FIGS. 9A and B and Table 3). Phototrophic cells showed a lag in Hg⁰ production with the peak of Hg⁰ production occurring 11 h later than what was previously observed (FIG. 5A and FIG. 9A). It is hypothesized that this lag may be attributed to the time required to generate a sufficient amount of reducing power, probably in the form of NADH. NADH acts as an electron donor to the heliobacterial photosynthetic transport chain, eventually reducing the pool of ferredoxin via light-induced low potential electrons.[35]

Although cells did not grow, NTZ did not arrest all metabolism or trigger cell death because Hg⁰ production was observed (ca. 80 pmol), albeit after a considerable lag phase. NTZ is a specific inhibitor of PFOR and it is hypothesized that phototrophic cell growth may have been inhibited because acetyl-CoA generated as a result of PFOR activity is an essential metabolite (FIG. 9B). In the absence of acetate, PFOR-mediated oxidation of pyruvate is the only known pathway leading to acetyl-CoA production in *H. modesticaldum*.[33] That being said, the ability of uninhibited cells to use PFOR and grow may have afforded them additional means of generating reducing power, possibly explaining the absence of a delay in Hg⁰ production.

Figure 10:
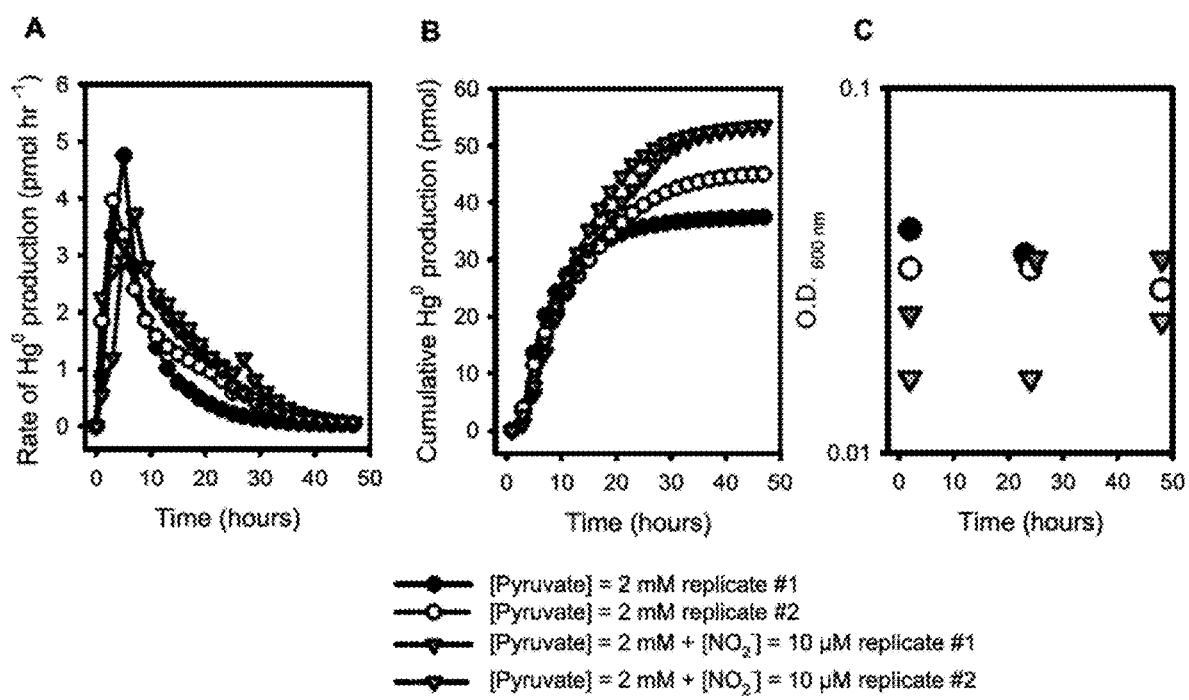
FIG. 10 shows repeated experiments measuring Hg$^0$ production by *Heliobacterium modesticaldum* Ice1 grown chemotrophically on pyruvate in the presence of a hydrogenase inhibitor, NO$_2^-$. A-C Rate of Hg$^0$ production (A), cumulative Hg$^0$ production (B) and microbial growth (C) for cells initially grown in PYE medium, supplied with 2 mM pyruvate as a sole carbon source and 10 µM NaNO$_2$ in the bioreactor. The average quantity of HgCl$_2$ present at the beginning of each assay was 177.18±12.84 µmol.

As an additional test for the role of reduced ferredoxin availability on $Hg^{II}$ reduction, a series of experiments were conducted where it was attempted to inhibit the activity of *H. modesticaldum*'s hydrogenase. In *H. modesticaldum*, a [Fe]-hydrogenase is predicted to be responsible for recycling the pool of reduced ferredoxin via proton reduction and subsequent $H_2$ production.[29,36] It was predicted that an inhibition of the hydrogenase during chemotrophic growth would increase Hg⁰ production because more reduced ferredoxin would be available for $Hg^{II}$ reduction. In support of the prediction a 30% increase in the amount of Hg⁰ produced (53.36±0.13 pmol vs 41.29±5.41 μmol) was observed in the presence of $NO_2^-$ (an inhibitor of [Fe]-hydrogenase)[37,38] (FIG. 10 and Table 3).

These results indicate that in the absence of PFOR activity (be it through direct inhibition or lack of substrate), cells can continue to reduce $Hg^{II}$ when other means of generating reducing equivalents are available. It is hypothesized that ferredoxin may be the main electron carrier involved in $Hg^{II}$ reduction but the contributions of other reducing equivalents such as NAD(P)H cannot be ruled out. It may also be possible that components of the photosynthetic chain may directly catalyze $Hg^{II}$ reduction before the production of cytosolic reduced ferredoxin, representing an additional means by which *H. modesticaldum* may affect Hg redox cycling. Finally, it can be ruled out that the mercuric reductase (MerA) is involved in NAD(P)H-mediated Hg reduction in *H. modesticaldum* given that no mer-operon or MerA homologues have been detected in the genome of *H. modesticaldum*.

Hg Reduction is Associated with a Fermentative Lifestyle.

It was next sought to test whether other anaerobes reduced $Hg^{II}$ through similar means to *H. modesticaldum*. $Hg^0$ production in an obligate fermenter was compared to that of other model anaerobes which favor anaerobic respiration. To achieve this objective, experiments were repeated with three additional strains possessing genes encoding for PFOR and who use ferredoxin as a reduced cofactor: *C. acetobutylicum*, *G. sulfurreducens* and *E. coli*. Additional details on the pyruvate metabolism of these strains is as follows:

*Clostridium acetobutylicum* ATCC 824 is a strict fermentative anaerobe known to have a central carbon metabolism similar to *H. modesticaldum* (Tang, K. H.; Feng, X. Y.; Zhuang, W. Q.; Alvarez-Cohen, L.; Blankenship, R. E.; Tang, Y. J., Carbon flow of Heliobacteria is related more to Clostridia than to the green sulfur bacteria. *Journal of Biological Chemistry* 2010, 285, (45), 35104-35112). Both strains oxidize pyruvate to acetyl-CoA via PFOR and produce reduced ferredoxin, but the acetyl-CoA generated by *C. acetobutylicum* can be a precursor of several oxidized (e.g., acetate, acetone, $CO_2$) or reduced (e.g., butanol, butyrate) products, the ratios of which depend on environmental culture conditions (Kim, B. H.; Bellows, P.; Datta, R.; Zeikus, J. G., Control of carbon and electron flow in *Clostridium acetobutylicum* fermentations: utilization of carbon-monoxide to inhibit hydrogen production and to enhance butanol yields. *Applied and Environmental Microbiology* 1984, 48, (4), 764-770).

*Geobacter sulfurreducens* PCA is a non-fermentative strain (Caccavo, F.; Lonergan, D. J.; Lovley, D. R.; Davis, M.; Stolz, J. F.; McInerney, M. J., *Geobacter sulfurreducens* sp-nov, a hydrogen-oxidizing and acetate-oxidizing dissimilatory metal-reducing microorganism. *Applied and Environmental Microbiology* 1994, 60, (10), 3752-3759) known to reduce $Hg^{II}$ (Lin, H.; Morrell-Falvey, J. L.; Rao, B.; Liang, L. Y.; Gu, B. H., Coupled mercury-cell sorption, reduction, and oxidation on methylmercury production by *Geobacter sulfurreducens* PCA. *Environmental Science & Technology* 2014, 48, (20), 11969-11976; Wiatrowski, H. A.; Ward, P. M.; Barkay, T., Novel reduction of mercury(II) by mercury-sensitive dissimilatory metal reducing bacteria. *Environmental Science and Technology* 2006, 40, (21), 6690-6696) that requires an exogenous terminal electron acceptor to generate energy (Lovley, D. R.; Holmes, D. E.; Nevin, K. P., Dissimilatory Fe(III) and Mn (IV) reduction. *Advances in microbial physiology* 2004, 49, 219-286). *G. sulfurreducens* can also use pyruvate as a carbon source (Speers, A. M.; Reguera, G., Electron donors supporting growth and electroactivity of *Geobacter sulfurreducens* anode biofilms. *Applied and Environmental Microbiology* 2012, 78, (2), 437-444). It has three enzyme systems capable of converting pyruvate to acetyl-CoA: pyruvate-ferredoxin oxidoreductase (PFOR with ferredoxin as a cofactor), pyruvate-formate lyase (PFL; no redox cofactor), and a putative pyruvate dehydrogenase complex (PDH, NADH/NAD+ and FADH/FAD+ as redox cofactors) (Methe, B. A.; Nelson, K. E.; Eisen, J. A.; Paulsen, I. T.; Nelson, W.; Heidelberg, J. F.; Wu, D.; Wu, M.; Ward, N.; Beanan, M. J.; Dodson, R. J.; Madupu, R.; Brinkac, L. M.; Daugherty, S. C.; DeBoy, R. T.; Durkin, A. S.; Gwinn, M.; Kolonay, J. F.; Sullivan, S. A.; Haft, D. H.; Selengut, J.; Davidsen, T. M.; Zafar, N.; White, O.; Tran, B.; Romero, C.; Forberger, H. A.; Weidman, J.; Khouri, H.; Feldblyum, T. V.; Utterback, T. R.; Van Aken, S. E.; Lovley, D. R.; Fraser, C. M., Genome of *Geobacter sulfurreducens*: Metal reduction in subsurface environments. *Science* 2003, 302, (5652), 1967-1969). PFOR appears essential for conversion of pyruvate into acetate, $CO_2$ and reduced ferredoxin, but this reaction is slow (Speers, A. M.; Reguera, G., Electron donors supporting growth and electroactivity of *Geobacter sulfurreducens* anode biofilms. *Applied and Environmental Microbiology* 2012, 78, (2), 437-444). Alternatively, pyruvate can be converted to acetyl-CoA via the PDH complex when fumarate is used as a terminal electron acceptor (Speers, A. M.; Reguera, G., Electron donors supporting growth and electroactivity of *Geobacter sulfurreducens* anode biofilms. *Applied and Environmental Microbiology* 2012, 78, (2), 437-444).

Finally, *Escherichia coli* K-12 is a facultative anaerobe. *E. coli* can grow fermentatively and has several enzymes that can catalyze the conversion of pyruvate into acetyl-CoA including a PFL, a PDH complex and a PFOR. It has been shown for *E. coli* that PFOR is 100 to 1000 times less active than PFL or PDH and the latter two systems are the principal enzymes converting pyruvate into acetyl-CoA (Blaschkowski, H. P.; Neuer, G.; Ludwig-Festl, M.; Knappe, J., Routes of flavodoxin and ferredoxin reduction in *Escherichia coli* Coa-acylating pyruvate:flavodoxin and NADPH:flavodoxin oxidoreductases participating in the activation of pyruvate formate-lyase. European *Journal of Biochemistry* 1982, 123, 563-569).

Figure 9:
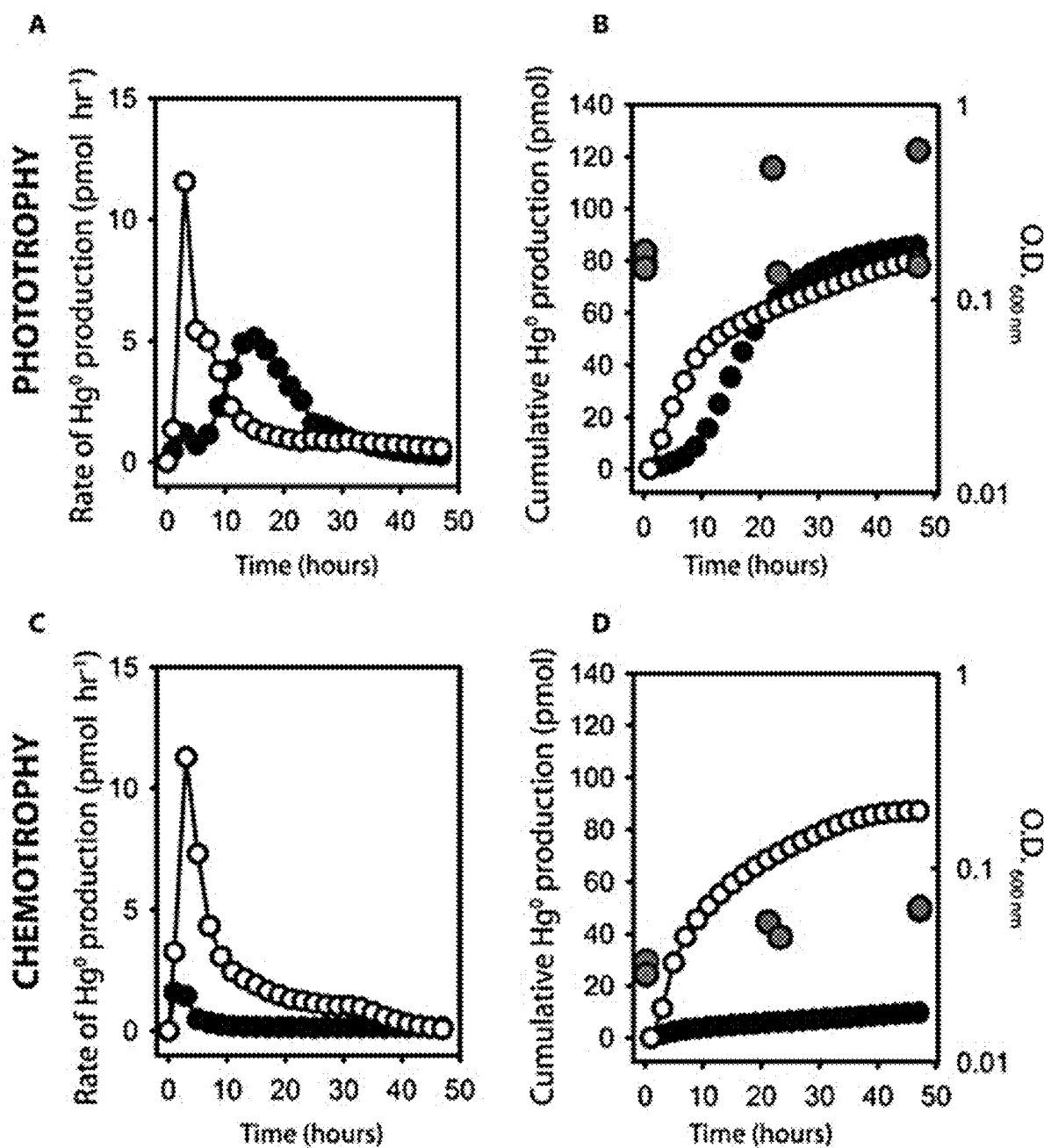
FIG. 9 shows $Hg^0$ production by *Heliobacterium modesticaldum* Ice1 grown phototrophically and chemotrophically with or without nitazoxanide (NTZ). A, C Rate of $Hg^0$ production for live cells exposed to 10 μM NTZ and controls exposed 2.8 mM DMSO (NTZ solvent) under phototrophic (A) and chemotrophic (C) conditions. B, D Cumulative $Hg^0$ production and cell growth (as measured by O.D. 600 nm) for live cells, exposed to 10 μM NTZ and controls exposed to 2.8 mM DMSO (NTZ solvent) under phototrophic (B) and chemotrophic (D) conditions. Results are representative cases of replicated experiments (n=2). Each data point was recorded once per time step by the instrument as such no error bars were included. Hg was added to a final concentration of 250 pM. White circles (—○—)=$Hg^0$ production (Pyruvate 20 mM; Yeast extract 4 g·L$^{-1}$); black circles (●)=Hg$^0$ production (Pyruvate 20 mM; Yeast extract 4 g·L$^{-1}$; NTZ 10 µM); red circles (●)=O.D.$_{600nm}$ (Pyruvate 20 mM; Yeast extract 4 g·L$^{-1}$); blue circles (●)=O.D.$_{600nm}$ (Pyruvate 20 mM; Yeast extract 4 g·L$^{-1}$; NTZ 10 µM)
Figure 11:
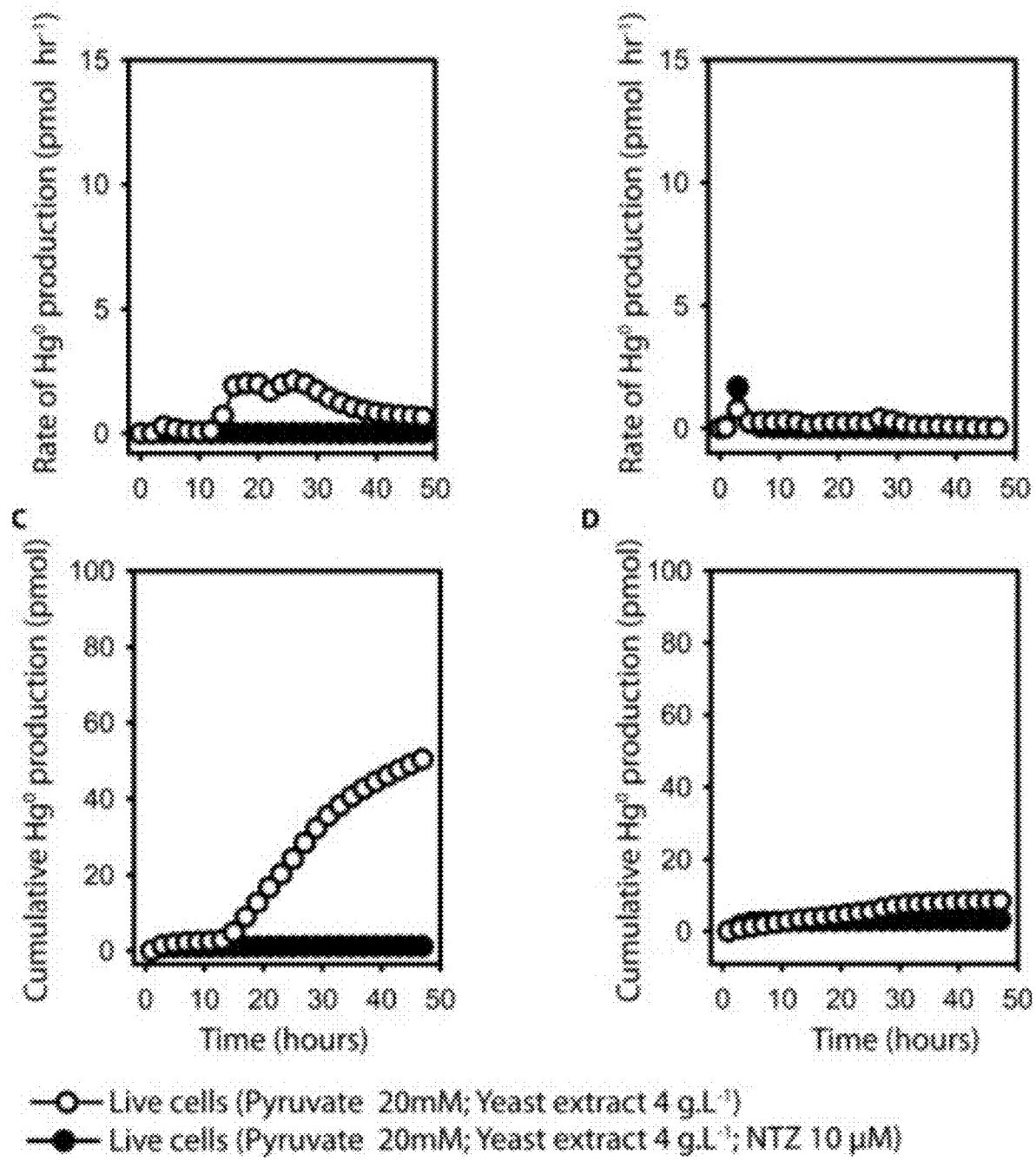
FIG. 11 shows Hg$^0$ production by anaerobic bacteria grown chemotrophically in the presence of a pyruvate:ferredoxin oxidoreductase inhibitor (NTZ). A, C Rate of Hg$^0$ production for *Clostridium acetobutylicum* ATCC 824 (A), and *Geobacter sulfurreducens* PCA (C) cells exposed to 10 µM NTZ and controls exposed to 2.8 mM DMSO (NTZ solvent). B, D Cumulative Hg$^0$ production for *C. acetobutylicum* (B), and *G. sulfurreducens* (D) cells exposed to 10 µM NTZ and controls exposed to 2.8 mM DMSO (NTZ solvent). Hg was added to a final concentration of 250 pM.
Figure 12:
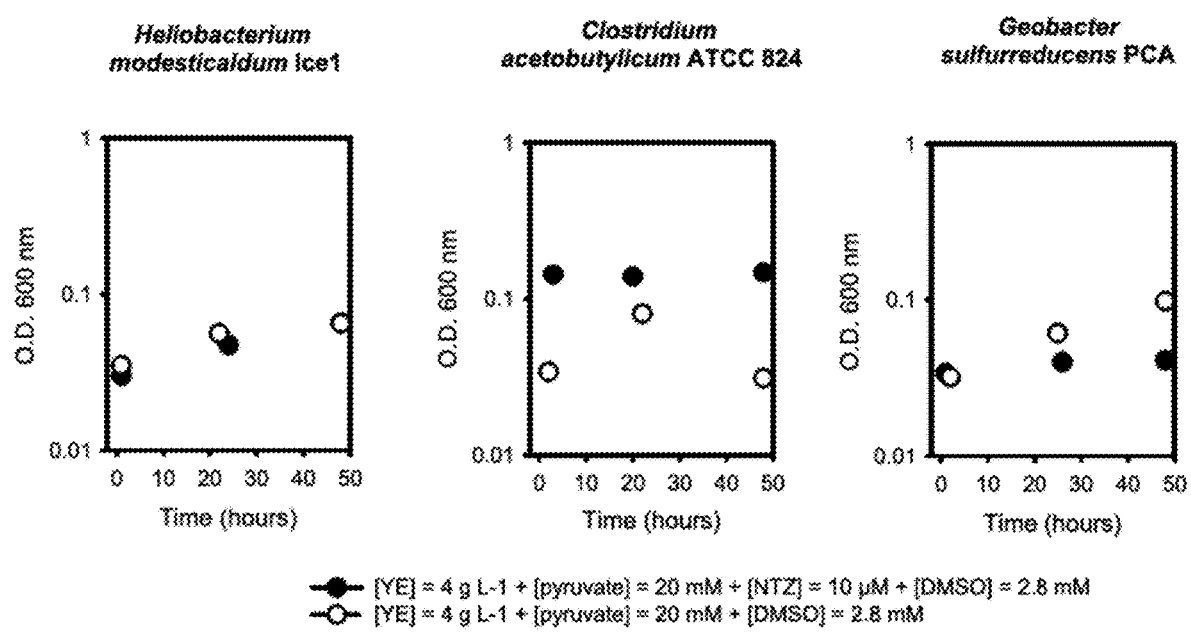
FIG. 12 shows growth curves for *Heliobacterium modesticaldum* Ice1, *Clostridium acetobutylicum* ATCC 824 and *Geobacter sulfurreducens* PCA in PYE medium in the presence of NTZ and DMSO.
Figure 13:
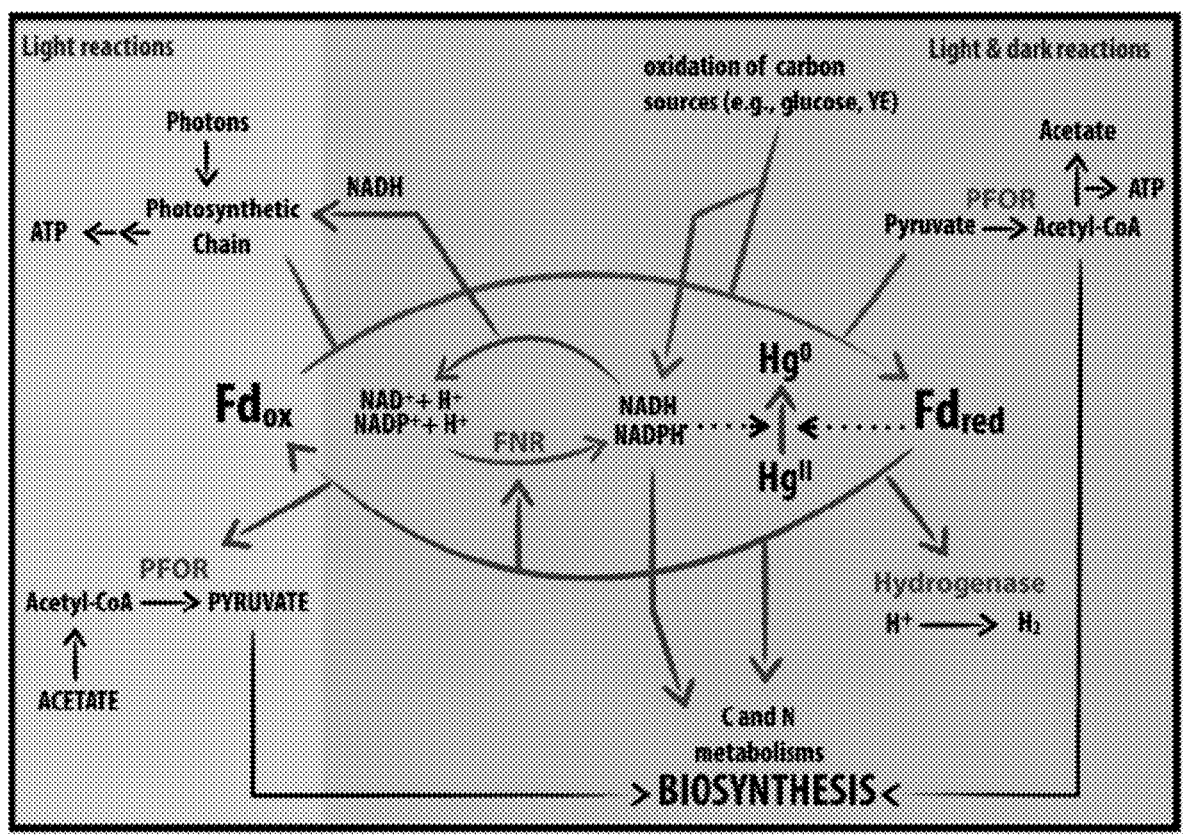
FIG. 13 shows a mechanistic summary of Hg$^0$ production during phototrophic growth of *Heliobacterium modesticaldum* Ice1 and chemotrophic pyruvate fermentation. Abbreviations: Oxidized and reduced ferredoxin=Fd ox. and Fd red., respectively; pyruvate:ferredoxin oxidoreductase=PFOR, ferredoxin-NAD(P)+ oxidoreductase=FNR. All red arrows correspond to reducing power consumption pathways and blue arrows correspond to reducing power production pathways. Enzyme names are in purple.

First, NTZ exposure experiments were performed with *C. acetobutylicum* and *G. sulfurreducens*. Although both strains differed in the magnitude of $Hg^0$ produced, NTZ inhibited $Hg^{II}$ reduction in both strains tested (FIG. 11). *C. acetobutylicum* produced 83% more $Hg^0$ than *G. sulfurreducens* (51.02 µmol vs 8.46 µmol) achieving total $Hg^0$ production on the same order of magnitude as *H. modesticaldum* (ca. 70 µmol) (FIG. 9 and FIG. 11); this difference in Hg reduction ability between the two strains was also observed when each strain was grown in their own optimal growth medium (Table 3). In the presence of NTZ, $Hg^0$ production decreased by 98% and 62%, respectively (1.20 µmol and 3.19 µmol) which is comparable to the 88% decrease observed for *H. modesticaldum* (FIG. 9 and FIG. 11). Given that NTZ affected Hg production to a similar degree across the model organisms studied, these results suggest that the production of reduced ferredoxin is linked to $Hg^{II}$ reduction across multiple anaerobes.

*C. acetobuytlicum* did not exhibit two distinct peaks and $Hg^0$ production occurred 14 h into the experiment (FIG. 11A). In this case, it is hypothesized that the lag in $Hg^0$ production may be attributed to the time required for cells to oxidize sufficient amounts of pyruvate to reduce the pool of oxidized ferredoxin. In all cases, growth was very slow (FIG. 12), which could be due to the presence of DMSO, an essential carrier solvent for the NTZ inhibitor.

The considerably lower $H^0$ production observed in *G. sulfurreducens* may be associated with the slow reaction of its PFOR system, as previously reported.[39,40] Alternatively, the inability of cells to grow under the conditions tested and thereby recycle the pool of redox cofactors necessary to reduce $Hg^{II}$ may have contributed to the lower values observed.

To test for this, the ability of G. sulfurreducens to reduce $Hg^{II}$ with and without fumarate as a terminal electron acceptor was evaluated. The presence of fumarate should enable growth but also the activation of pyruvate dehydrogenase (PDH).[39] In the presence of fumarate, G. sulfurreducens cells were able to grow but $Hg^0$ production decreased by 50% (Table 3). Similarly, $Hg^0$ production by E. coli, which mostly relies on pyruvate formate lyase (PFL) and PDH activity rather than PFOR for pyruvate metabolism, was virtually undetectable (i.e., not different from autoclaved controls), although cells were able to grow (Table 3).

These experiments showed that $Hg^0$ production was greater for fermentative anaerobes (H. modesticaldum and C. acetobutylicum), regardless of growth ability. Based on these studies, it is hypothesized that the availability of reduced ferredoxin is limited for G. sulfurreducens or E. coli because of the slow reaction of PFOR in both strains, or because alternate pathways to metabolize pyruvate are activated. Without wishing to be bound by theory, it may be possible that fermenters may have more reducing power available for $Hg^{II}$ reduction compared to cells capable of respiration.

Discussion

Environmental Relevance

These studies provide what is believed to be the first evidence for $Hg^{II}$ reduction in a previously unexplored family of anoxygenic phototrophs, the Heliobacteria, and propose a new mechanism for $Hg^{II}$ reduction that is also supported during fermentation by another member of the Clostridiales (C. acetobutylicum). These findings are summarized in FIG. 13. $Hg^{II}$ reduction was dependent on the ability of H. modesticaldum to generate reducing power (possibly ferredoxin) through the photosynthetic electron transport chain or organic carbon oxidation. Furthermore, $Hg^{II}$ likely competes with other redox homeostasis pathways such as $H_2$ production for this pool of reductants.

H. modesticaldum exhibited some of the highest $Hg^0$ production yields relative to $Hg^{II}$ substrate concentrations. This is interesting because in this study, $Hg^{II}$ was supplied at pM levels; a compilation of other biotic and abiotic $Hg^0$ production data is provided in Table 2. Furthermore, C. acetobutylicum also exhibited $Hg^0$ production rates that agree with [$Hg^0$] in previous studies[13-15,18-21,41-46] (Table 2). Taking into consideration $Hg^0$ concentrations reported from saturated soil, sediment, and groundwater environments, the present studies suggest that photoheterotrophy (where light is available) and fermentation (in environments where the availability of light and/or external electron acceptors are limited) may contribute to observed environmental levels of $Hg^0$ (Table 2).

TABLE 2

$Hg^0$ Production for Anaerobic and Abiotic Pathways in Anoxic Environments

| Model organisms/systems | [Hg] (pM) | rate of $Hg^0$ production (pmol · $L^{-1}$ · $hr^{-1}$) | relative $Hg^0$ production (%) | ref |
|---|---|---|---|---|
| Magnetotatic facultative anaerobic bacteria: Magnetospirillum gryphiswaldense MSR-1 and Magnetospirillum magnetotacticum MS-1 | $2.5 \times 10^6$ | $2.08 \times 10^3$-$8.75 \times 10^3$ | 7.87-24.48$^a$ | 44 |
| Obligate anaerobe with mer operon homologues: Geobacter bemidjiensis Bem | $2.5 \times 10^4$ | $1.19 \times 10^3$ | 38 | 45 |
| Facultative anaerobe carrying mer-operon: Pseudomonas stutzeri OX | $2.00 \times 10^6$-$2.50 \times 10^7$ | $1.83 \times 10^4$-$9.50 \times 10^5$ | 30-80 | 41 |
| Dissimilatory metal reducing bacteria: Shewanella oneidensis MR-1 and Geobacter sulfurreducens PCA | $1.50 \times 10^5$-$8.25 \times 10^5$ | $3.30 \times 10^3$-$8.70 \times 10^4$ | 30-65 | 19 |
| Dissimilatory metal reducing bacteria: Geobacter sulfurreducens PCA | $2.50 \times 10^4$ | $3.75 \times 10^3$ | 60-64 | 20, 46 |
| Dissimilatory metal reducing bacteria: Geobacter sulfurreducens PCA | 250 | 1.92-4.06 | 7.11-11.65$^b$ | this study |
| Firmicute: Clostridium acetobutylicum ATCC 824 | 250 | 2.94-15.92 | 23.14-25.97$^c$ | this study |
| Heliobacteria: Heliobacterium modesticaldum Ice1 | 250 | 13.45-17.82 | 56.31-72.30 | this study |
| Purple non-sulfur bacteria: Rhodobacter capsulatus SB1003, Rhodobacter sphaeroides 2.4.1, Rhodopeudomonas palustris TIE-1 | 250 | 0.30-3.30 | 4.97-20.28 | 21 |
| In-situ metalimnetic incubation in a boreal lake | 10 | 0.001 | 1 | 42 |
| Photoreduction in surface lake waters | 5.40-18.20 | 0.01-0.085 | 10-40 | 42 |
| $Hg^0$ in Canadian Shield lake sediments | $4.24 \times 10^5$-$1.21 \times 10^6$ | NA | 7.40-28.4 | 15 |
| $Hg^0$ in flooded soil core (A horizon) | $2.00 \times 10^5$ | 120 | 54 | 14 |
| $Hg^0$ in volcanic aquifer groundwater | 190 | NA | 39.26 | 43 |
| Abiotic reduction by DOM in anoxic conditions | $1.00 \times 10^4$ | $1.75 \times 10^3$ | 70 | 18 |
| Abiotic reduction by biogenic magnetite | $2.50 \times 10^5$ | $1.07 \times 10^4$-$8.09 \times 10^4$ | 8.55-64.7 | 44 |

$^a$Experiments were carried out under microaerobic conditions.
$^b$11.65 pmol $L^{-1}$ $hr^{-1}$ is from experiments in G. sulfurreducens's optimal medium.
$^c$25.97 pmol $L^{-1}$ $hr^{-1}$ is from experiments in C. acetobutylicum's optimal medium.

Although H. modesticaldum is a thermophile, it serves as a model representative for the family Heliobacteria. As a family, most Heliobacteria were isolated from terrestrial environments such as rice paddies and exhibit a mutualistic relationship with the rice plant (e.g., exchange of nutrients).[47]

These metabolisms are well suited to limiting Hg methylation by reducing $Hg^{II}$ to gaseous $Hg^0$ that can readily evade to the atmosphere from shallow paddy soils. Such strategies may also limit Hg methylation through competition for resources because fermenters and Hg methylators (e.g., sulfate reducing bacteria, methanogens) typically occupy the same niches. The ability of some microbes to catalyze both Hg reduction and methylation may be another consideration.[45] An understanding of the physiological controls of such processes and how they are coupled to carbon metabolism and redox homeostasis may offer significant insights into management of Hg pollution.

The present studies indicate that microbial fermentative cells may be poised to affect the redox cycling of (toxic) metals that can act as exogenous electron acceptors. In environments where fermenters thrive, cells at risk of Hg toxicity may benefit from $Hg^{II}$ reduction as a detoxification strategy; this may have precluded the need to maintain strategies such as the mer-operon for Hg detoxification. This idea is supported by the fact that very few studies report functional mer-operons in obligate anaerobes[22] and to the best of our knowledge no genetic determinants encoding for Hg detoxification strategies specific to anaerobes have been described so far. The present study highlights the importance of including microbial physiology in addition to genome-based tools when elucidating non-conventional Hg reduction pathways. Clearly, the redox conditions that can support microbial $Hg^{II}$ reduction are more diverse than previously perceived and may occur across a wide range of metabolisms and environments.

TABLE 3

Growth Conditions and Results of Studies in Example 1

| | | | Inoculum conditions | |
| --- | --- | --- | --- | --- |
| Treatment | Strain | Metabolism | Temp. (Celsius) | Carbon source (mM or g L−1) |
| Live | *H. modesticaldum* Ice1 | Phototrophy | 50 | Pyruvate (20 mM) + YE (4 g L−1) |
| Live | *H. modesticaldum* Ice1 | Phototrophy | 50 | Pyruvate (20 mM) + YE (4 g L−1) |
| Autoclaved | *H. modesticaldum* Ice1 | Phototrophy | 50 | Pyruvate (20 mM) + YE (4 g L−1) |
| Sterile | *H. modesticaldum* Ice1 | Phototrophy | 50 | Pyruvate (20 mM) + YE (4 g L−1) |
| Live | *H. modesticaldum* Ice1 | Phototrophy | 50 | Pyruvate (20 mM) + YE (4 g L−1) |
| Live | *H. modesticaldum* Ice1 | Phototrophy | 50 | Pyruvate (20 mM) + YE (4 g L−1) |
| Live | *H. modesticaldum* Ice1 | Phototrophy | 50 | Pyruvate (20 mM) + YE (4 g L−1) |
| Live | *H. modesticaldum* Ice1 | Phototrophy | 50 | Pyruvate (20 mM) + YE (4 g L−1) |
| Live | *H. modesticaldum* Ice1 | Phototrophy | 50 | Acetate (30 mM) + YE (4 g L−1) |
| Live | *H. modesticaldum* Ice1 | Phototrophy | 50 | Acetate (30 mM) + YE (4 g L−1) |
| Live | *H. modesticaldum* Ice1 | Phototrophy | 50 | Acetate (30 mM) + YE (4 g L−1) |
| Live | *H. modesticaldum* Ice1 | Phototrophy | 50 | Acetate (30 mM) + YE (4 g L−1) |
| Live | *H. modesticaldum* Ice1 | Phototrophy | 50 | YE (4 g L−1) |
| Live | *H. modesticaldum* Ice1 | Phototrophy | 50 | YE (4 g L−1) |
| Live | *H. modesticaldum* Ice1 | Phototrophy | 50 | Pyruvate (20 mM) + YE (4 g L−1) |
| Live | *H. modesticaldum* Ice1 | Phototrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Autoclaved | *H. modesticaldum* Ice1 | Chemotrophy | 50 | Pyruvate (20 mM) + YE (4 g L−1) |
| Sterile | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Sterile | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Live | *H. modesticaldum* Ice1 | Chemotrophy | 50 | Pyruvate (20 mM) + YE (4 g L−1) |
| Live | *G. sulfurreducens* PCA | Chemotrophy | 28 | Acetate (10 mM) |
| Live | *G. sulfurreducens* PCA | Chemotrophy | 28 | Acetate (10 mM) |
| Live | *G. sulfurreducens* PCA | Chemotrophy | 28 | Acetate (10 mM) |
| Live | *G. sulfurreducens* PCA | Chemotrophy | 28 | Acetate (10 mM) |
| Live | *G. sulfurreducens* PCA | Chemotrophy | 28 | Acetate (10 mM) |
| Live | *G. sulfurreducens* PCA | Chemotrophy | 28 | Acetate (10 mM) |
| Live | *C. acetobutylicum* | Chemotrophy | 37 | Glucose (28 mM) + Peptone (10 g L−1) + YE (10 g L−1) |
| Live | *C. acetobutylicum* | Chemotrophy | 37 | Glucose (28 mM) + Peptone (10 g L−1) + YE (10 g L−1) |
| Live | *C. acetobutylicum* | Chemotrophy | 37 | Glucose (28 mM) + Peptone (10 g L−1) + YE (10 g L−1) |
| Live | *C. acetobutylicum* | Chemotrophy | 37 | Glucose (28 mM) + Peptone (10 g L−1) + YE (10 g L−1) |
| Live | *C. acetobutylicum* | Chemotrophy | 37 | Glucose (28 mM) + Peptone (10 g L−1) + YE (10 g L−1) |
| Live | *E. coli* K-12 | Chemotrophy | 37 | Pyruvate (20 mM) + YE (4 g L−1) |

| | | Bioreactor conditions | | |
| --- | --- | --- | --- | --- |
| Electron sink/Inhibitor/ treatment (μM or mM) | Inoculum O.D. 600 nm | Metabolism | Temp. (Celsius) | Carbon source (mM or g L−1) |
| NA | 0.574 | Phototrophy | 50 | Pyruvate (20 mM) + YE (4 g L−1) |
| NA | 0.872 | Phototrophy | 50 | Pyruvate (20 mM) + YE (4 g L−1) |

TABLE 3-continued

Growth Conditions and Results of Studies in Example 1

| | | | | |
|---|---|---|---|---|
| NA | 0.582 | Phototrophy | 50 | Pyruvate (20 mM) + YE (4 g L−1) |
| NA | NA | Phototrophy | 50 | Pyruvate (20 mM) + YE (4 g L−1) |
| NA | 0.82 | Phototrophy | 50 | Pyruvate (20 mM) + YE (4 g L−1) |
| NA | 0.78 | Phototrophy | 50 | Pyruvate (20 mM) + YE (4 g L−1) |
| NA | 0.935 | Phototrophy | 50 | Pyruvate (20 mM) + YE (4 g L−1) |
| NA | 0.446 | Phototrophy | 50 | Pyruvate (20 mM) + YE (4 g L−1) |
| NA | 0.292 | Phototrophy | 50 | Acetate (30 mM) + YE (4 g L−1) |
| NA | 0.205 | Phototrophy | 50 | Acetate (30 mM) + YE (4 g L−1) |
| NA | 0.13 | Phototrophy | 50 | Acetate (30 mM) + YE (4 g L−1) |
| NA | 0.201 | Phototrophy | 50 | Acetate (30 mM) + YE (4 g L−1) |
| NA | 0.383 | Phototrophy | 50 | YE (4 g L−1) |
| NA | 0.321 | Phototrophy | 50 | YE (4 g L−1) |
| NA | 0.656 | Phototrophy | 50 | No Carbon |
| NA | 0.792 | Phototrophy | 50 | No Carbon |
| NA | 0.236 | Chemotrophy | 50 | Pyruvate (20 mM) + YE (4 g L−1) |
| NA | 0.285 | Chemotrophy | 50 | Pyruvate (20 mM) + YE (4 g L−1) |
| NA | 0.247 | Chemotrophy | 50 | Pyruvate (20 mM) + YE (4 g L−1) |
| NA | 0.265 | Chemotrophy | 50 | Pyruvate (20 mM) + YE (4 g L−1) |
| NA | NA | Chemotrophy | 50 | Pyruvate (20 mM) + YE (4 g L−1) |
| NA | 0.296 | Chemotrophy | 50 | Pyruvate (20 mM) + YE (4 g L−1) |
| NA | 0.254 | Chemotrophy | 50 | Pyruvate (20 mM) + YE (4 g L−1) |
| NA | 0.292 | Chemotrophy | 50 | Pyruvate (20 mM) + YE (4 g L−1) |
| NA | 0.276 | Chemotrophy | 50 | Pyruvate (20 mM) + YE (4 g L−1) |
| NA | 0.269 | Chemotrophy | 50 | Acetate (30 mM) |
| NA | 0.24 | Chemotrophy | 50 | Acetate (30 mM) |
| NA | 0.247 | Chemotrophy | 50 | YE (4 g L−1) |
| NA | 0.21 | Chemotrophy | 50 | YE (4 g L−1) |
| NA | 0.277 | Chemotrophy | 50 | Pyruvate (20 mM) + YE (0.2 g L−1) |
| NA | 0.27 | Chemotrophy | 50 | No Carbon |
| NA | 0.264 | Chemotrophy | 50 | No Carbon |
| NA | 0.311 | Chemotrophy | 50 | Pyruvate (2 mM) |
| NA | 0.261 | Chemotrophy | 50 | Pyruvate (2 mM) |
| NA | 0.265 | Chemotrophy | 50 | Pyruvate (2 mM) |
| NA | 0.269 | Chemotrophy | 50 | Pyruvate (2 mM) |
| NA | NA | Chemotrophy | 50 | Pyruvate (2 mM) |
| NA | 0.27 | Chemotrophy | 50 | Pyruvate (20 mM) |
| NA | 0.278 | Chemotrophy | 50 | Pyruvate (20 mM) |
| NA | 0.273 | Chemotrophy | 50 | Pyruvate (100 mM) |
| NA | 0.273 | Chemotrophy | 50 | Pyruvate (100 mM) |
| Fumarate (40 mM) | 0.219 | Chemotrophy | 28 | Pyruvate (20 mM) + YE (4 g L−1) |
| Fumarate (40 mM) | 0.243 | Chemotrophy | 28 | Pyruvate (20 mM) + YE (4 g L−1) |
| Fumarate (40 mM) | 0.232 | Chemotrophy | 28 | Pyruvate (20 mM) + YE (4 g L−1) |
| Fumarate (40 mM) | 0.248 | Chemotrophy | 28 | Pyruvate (20 mM) + YE (4 g L−1) |
| Fumarate (40 mM) | 0.21 | Chemotrophy | 28 | Acetate (10 mM) |
| Fumarate (40 mM) | 0.275 | Chemotrophy | 28 | Acetate (10 mM) |
| NA | 1.547 | Chemotrophy | 37 | Pyruvate (20 mM) + YE (4 g L−1) |
| NA | 1.546 | Chemotrophy | 37 | Pyruvate (20 mM) + YE (4 g L−1) |
| NA | 1.254 | Chemotrophy | 37 | Pyruvate (20 mM) + YE (4 g L−1) |
| NA | 1.495 | Chemotrophy | 37 | Pyruvate (20 mM) + YE (4 g L−1) |
| NA | 1.5 | Chemotrophy | 37 | Glucose 27 mM + Peptone (10 g L−1) + yeast (10 g L−1) |
| NA | 0.221 | Chemotrophy | 37 | Pyruvate (20 mM) + YE (4 g L−1) |

| Electron sink/Inhibitor/ treatment (μM or mM) | Replicate # | Initial O.D. 600 nm | Final O.D. 600 nm | Cumulative Hg(0) production (pmol) |
|---|---|---|---|---|
| NA | 1 | 0.046 | 0.523 | 101.99 |
| NA | 2 | 0.129 | 0.424 | 97.59 |
| NA | 1 | 0.063 | 0.058 | 5.26 |
| NA | 1 | 0.005 | 0.005 | 4.44 |
| NTZ (10 μM) + DMSO (2.8 mM) | 1 | 0.131 | 0.125 | 86.02 |
| NTZ (10 μM) + DMSO (2.8 mM) | 2 | 0.114 | 0.132 | 61.99 |
| DMSO (2.8 mM) | 1 | 0.148 | 0.495 | 81.23 |
| DMSO (2.8 mM) | 2 | 0.062 | 0.42 | 83.36 |
| NA | 1 | 0.042 | 0.061 | 58.06 |
| NA | 2 | 0.025 | 0.037 | 46.01 |
| HCO3— (10 mM) | 1 | 0.018 | 0.02 | 43.31 |
| HCO3— (10 mM) | 2 | 0.022 | 0.039 | 42.50 |
| NA | 1 | 0.041 | 0.035 | 92.27 |
| NA | 2 | 0.045 | 0.035 | 90.48 |
| NA | 1 | 0.084 | 0.047 | 94.46 |
| NA | 2 | 0.1 | 0.092 | 79.96 |
| NA | 1 | 0.033 | 0.361 | 126.94 |
| NA | 2 | 0.045 | 0.326 | 129.28 |
| NA | 3 | 0.031 | 0.321 | 117.16 |
| NA | 1 | 0.045 | 0.034 | 3.51 |
| NA | 1 | 0 | 0.016 | 3.69 |
| NTZ (10 μM) + DMSO (2.8 mM) | 1 | 0.03 | 0.065 | 9.85 |
| NTZ (10 μM) + DMSO (2.8 mM) | 2 | 0.028 | 0.057 | 4.43 |

TABLE 3-continued

Growth Conditions and Results of Studies in Example 1

| | | | | |
|---|---|---|---|---|
| DMSO (2.8 mM) | 1 | 0.035 | 0.065 | 87.23 |
| DMSO (2.8 mM) | 2 | 0.026 | 0.036 | 46.72 |
| NA | 1 | 0.036 | 0.038 | 5.50 |
| NA | 2 | 0.034 | 0.055 | 19.11 |
| NA | 1 | 0.032 | 0.037 | 8.24 |
| NA | 2 | 0.026 | 0.034 | 4.18 |
| NA | 1 | 0.03 | 0.04 | 56.51 |
| NA | 1 | 0.031 | 0.014 | 6.53 |
| NA | 2 | 0.019 | 0.028 | 15.84 |
| NA | 1 | 0.041 | 0.028 | 37.46 |
| NA | 2 | 0.032 | 0.028 | 45.12 |
| 10 µM NO2 | 1 | 0.024 | 0.034 | 53.47 |
| 10 µM NO2 | 2 | 0.016 | 0.023 | 53.66 |
| 10 µM NO2 | 1 | 0 | 0 | 3.60 |
| NA | 1 | 0.048 | 0.035 | 60.10 |
| NA | 2 | 0.033 | 0.034 | 58.92 |
| NA | 1 | 0.037 | 0.01 | 68.41 |
| NA | 2 | 0 035 | 0.025 | 56.56 |
| NA | 1 | 0.055 | 0.074 | 12.59 |
| NTZ (10 µM) + DMSO (2.8 mM) | 1 | 0.034 | 0.041 | 3.19 |
| DMSO (2.8 mM) | 1 | 0.032 | 0.098 | 8.46 |
| Fumarate (40 mM) | 1 | 0.023 | 0.185 | 6.65 |
| Fumarate (40 mM) | 1 | 0.034 | 0.016 | 19.81 |
| Fumarate (40 mM) | 2 | 0.036 | 0.038 | 21.48 |
| NA | 1 | 0.207 | 0.167 | 41.08 |
| NTZ (10 µM) + DMSO (2.8 mM) | 1 | 0.143 | 0.146 | 1.20 |
| DMSO (2.8 mM) | 1 | 0.215 | 0.139 | 41.00 |
| DMSO (2.8 mM) | 2 | 0.034 | 0.031 | 51.02 |
| NA | 1 | 0.037 | 1.221 | 52.49 |
| NA | 1 | 0.034 | 0.171 | 4.12 |

Example 2—Additional Testing Over Temperature Gradients and Increased Mercury Concentrations Additional testing was performed over temperature gradients and increased mercury concentrations to further build on the findings described in Example 1 above. Results are described in further detail below with reference to FIGS. 14-15.

Figure 14:
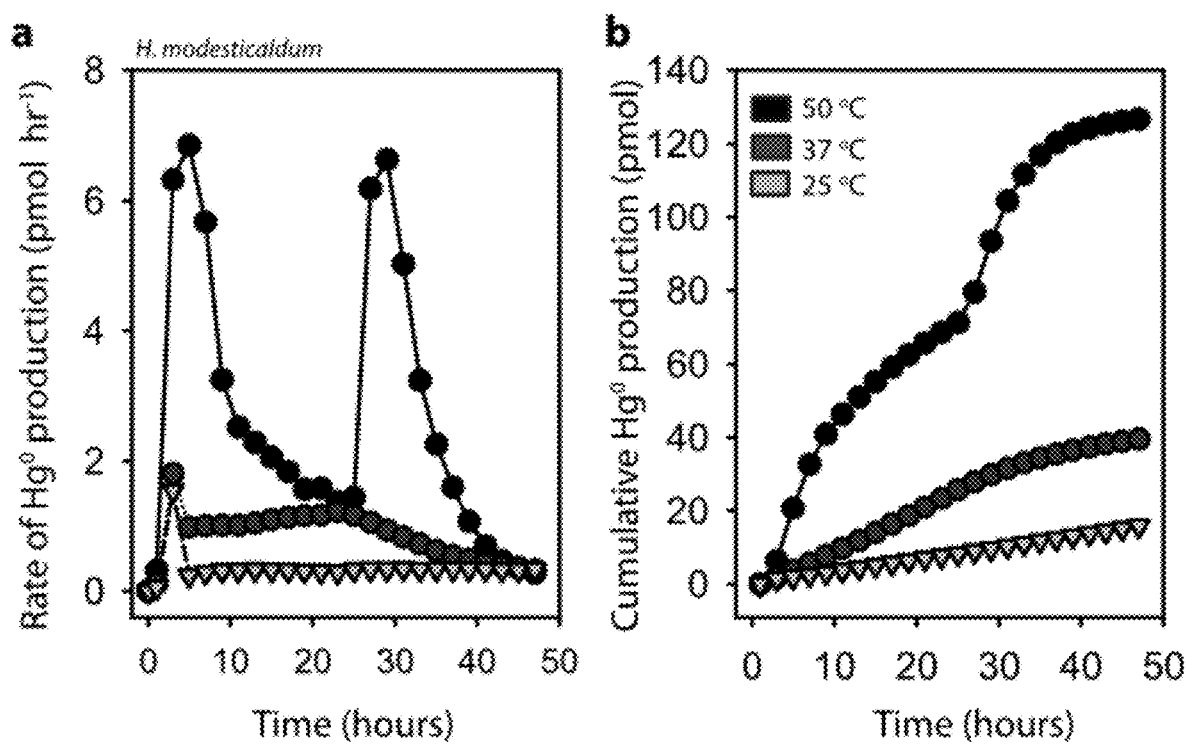
FIG. 14 shows trace mercury reduction over a temperature gradient with phototrophically-grown *Heliobacterium modesticaldum* Ice1. Rate (a) and cumulative gaseous mercury (Hg$^0$) production (b) for *H. modesticaldum* grown phototrophically at 50, 37 and 25° C. is shown.

The purpose of the temperature gradient experiments was to see if the presently described processes could be supported at suboptimal growth temperatures more representative of typical outdoor and/or industrial environments. In these studies, it was observed that the presently described processes may support the reduction of mercury at suboptimal growth temperatures for *H. modesticaldum*, although the efficiency of mercury removal decreased somewhat with temperature. Of note, cells were able to maintain growth at 37° C., but not 25° C. *H. modesticaldum* is a thermophile with an optimal growth temperature of 50-52° C. Results are shown in FIG. 14.

Figure 15:
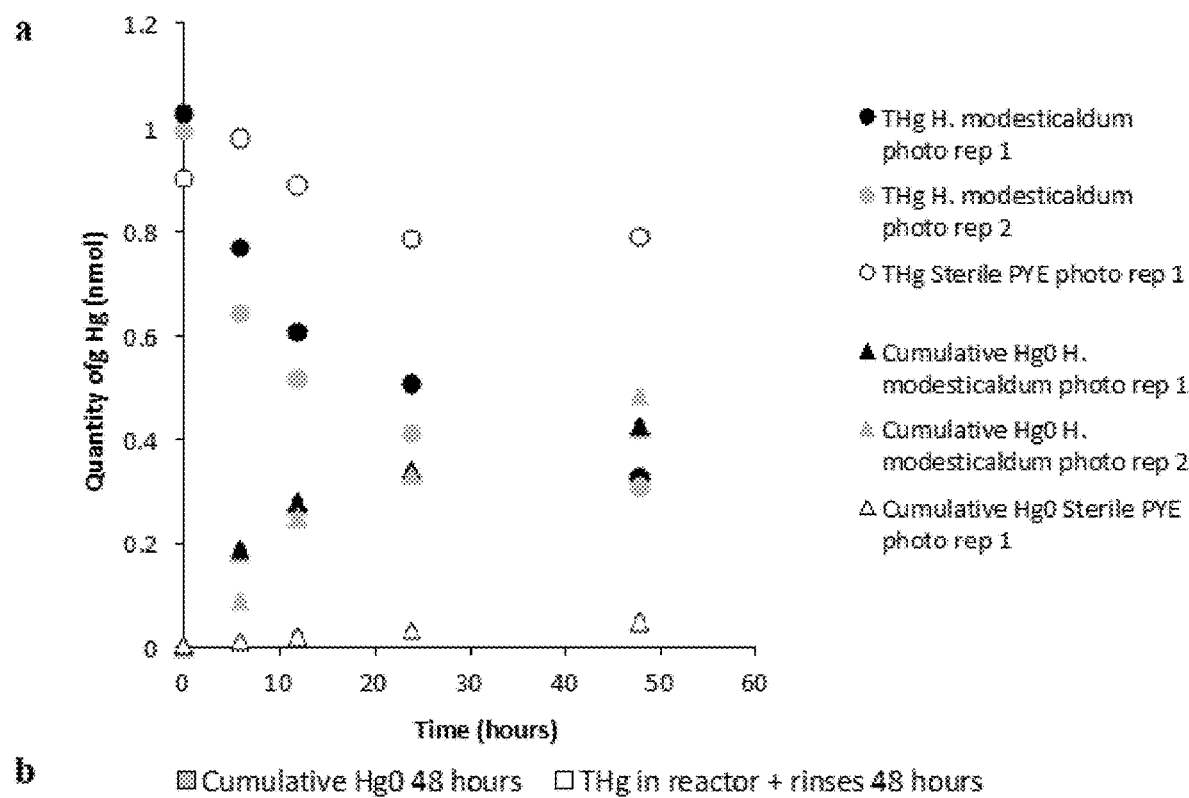
FIG. 15 shows mercury reduction at 2 nM Hg (~10-fold higher concentration than used in Example 1) for phototrophically-grown *Heliobacterium modesticaldum* Ice1. Total dissolved mercury (THg) and gaseous mercury (Hg$^0$) over time (a) and % recoveries of total mercury and Hg$^0$ (b) for phototrophically-grown *H. modesticaldum* Ice1 and sterile growth medium is shown.
Figure 15:
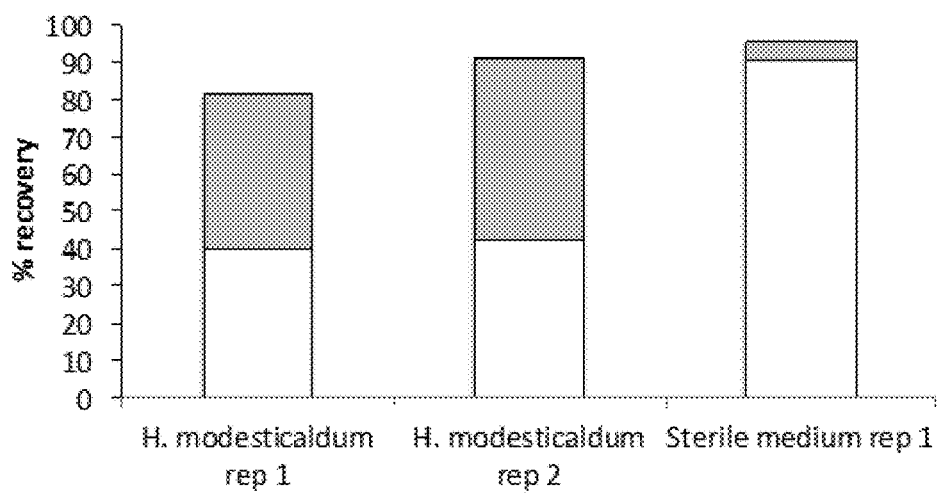

The purpose of the increased mercury concentration experiments was to measure if the presently described processes may work at ~10-fold higher mercury concentrations more representative of certain typical industrial effluents. This required the use of an alternate mercury measurement method, hence the lower time resolution associated with this data. Very similar relative mercury reduction was found even at higher concentrations, and cell health was unaffected in these studies. At 2 nM Hg live cells achieved relative $Hg^0$ productions of ~50% over 48 hours. Results are shown in FIG. 15.

Example 3—Testing of *Heliobacillus mobilis*

An additional member of the order Clostridales, and member of the family Heliobacteria, was also tested, namely *Heliobacillus mobilis* (a strain isolated from a rice paddy in Thailand). Photoheterotrophic $Hg^{II}$ reduction by *Heliobacillus mobilis* was characterized. These studies with *H. mobilis* were carried out in the same bioreactor setup described in Example 1 and in FIG. 16. Results indicated that the following conditions tested supported good Hg removal:
  A temperature in a range of about 37° C.;
  A pH in a range of about 6.8 to about 7.0;
  A light source and intensity as follows:
    Visible light from an incandescent bulb at about 1000 lux (or about 20 µmol $m^{-2}s^{-1}$);
    Higher light intensities preferred for microbial growth may support higher Hg removal;
  A cell density as measured via optical density at 600 nm as follows:
    For *H. mobilis*: about 0.1 to about 0.2;
  A Hg concentration as follows:
    As described in further detail below, mercury removal has been tested for a concentration of 250 pM;
  A gas supply of argon;
  Carbon source(s) and concentration(s) as follows:
    Pyruvate—20 mM;
    Yeast extract—10 g $L^{-1}$.

Hg removals achieved in these studies were approximately 50% of the initial Hg supplied as a spike at a final concentration of 250 pM.

One or more illustrative embodiments have been described by way of example. It will be understood to persons skilled in the art that a number of variations and modifications can be made without departing from the scope of the invention as defined in the claims.

REFERENCES (1) Fitzgerald, W. F.; Lamborg, C. H.; Hammerschmidt, C. R. Marine biogeochemical cycling of mercury. Chem. Rev. 2007, 107 (2), 641-662.

(2) Zhang, H.; Feng, X. B.; Larssen, T.; Qiu, G. L.; Vogt, R. D. In inland China, rice, rather than fish, is the major pathway for methylmercury exposure. Environ. Health Perspect. 2010, 118 (9), 1183-1188.

(3) Rothenberg, S. E.; Windham-Myers, L.; Creswell, J. E. Rice methylmercury exposure and mitigation: A comprehensive review. Environ. Res. 2014, 133, 407-423.

(4) Parks. J. M.; Johs, A.; Podar, M.; Bridou, R.; Hurt, R. A., Jr; Smith, S. D.; Tomanicek, S. J.; Qian, Y.; Brown, S. D.; Brandt, C. C.; Palumbo, A. V.; Smith, J. C.; Wall, J. D.; Elias, D. A.; Liang, L. The genetic basis for bacterial mercury methylation. Science 2013, 339 (6125), 1332-1335.

(5) Rothenberg, S. E.; Feng, X. Mercury cycling in a flooded rice paddy. Journal of Geophysical Research: Biogeosciences 2012, 117, G03003.

(6) Marvin-DiPasquale, M.; Windham-Myers, L.; Agee, J. L.; Kakouros, E.; Kieu, L. H.; Fleck, J. A.; Alpers, C. N.; Stricker, C. A. Methylmercury production in sediment from agricultural and non-agricultural wetlands in the Yolo Bypass, California, USA. Sci. Total Environ. 2014, 484, 288-299.

(7) Meng, B.; Feng, X. B.; Qiu, G. L.; Cai, Y.; Wang, D. Y.; Li, P.; Shang, L. H.; Sommar, J. Distribution patterns of inorganic mercury and methylmercury in tissues of rice (*Oryza sativa* L.) plants and possible bioaccumulation pathways. J. Agric. Food Chem. 2010, 58 (8), 4951-4958.

(8) Zhao, L.; Anderson, C. W. N.; Qiu, G. L.; Meng, B.; Wang, D. Y.; Feng, X. B. Mercury methylation in paddy soil: source and distribution of mercury species at a Hg mining area, Guizhou Province, China. Biogeosciences 2016, 13 (8), 2429-2440.

(9) Zhao, L.; Qiu, G. L.; Anderson, C. W. N.; Meng, B.; Wang, D. Y.; Shang, L. H.; Yan, H. Y.; Feng, X. B. Mercury methylation in rice paddies and its possible controlling factors in the Hg mining area, Guizhou province, Southwest China. Environ. Pollut. 2016, 215, 1-9.

(10) Warner, K. A.; Roden, E. E.; Bonzongo, J. C. Microbial mercury transformation in anoxic freshwater sediments under iron-reducing and other electron-accepting conditions. Environ. Sci. Technol. 2003, 37 (10), 2159-2165.

(11) Vidon, P. G.; Mitchell, C. P. J.; Jacinthe, P. A.; Baker, M. E.; Liu, X.; Fisher, K. R. Mercury dynamics in groundwater across three distinct riparian zone types of the US Midwest. Environmental Sciences: Processes and Impacts 2013, 15 (11), 2131-2141.

(12) Colombo, M. J.; Ha, J.; Reinfelder, J. R.; Barkay, T.; Yee, N. Anaerobic oxidation of Hg(0) and methylmercury formation by *Desulfovibrio desulfuricans* ND132. Geochim. Cosmochim. Acta 2013, 112, 166-177.

(13) Hu, H. Y.; Lin, H.; Zheng, W.; Tomanicek, S. J.; Johs, A.; Feng, X. B.; Elias, D. A.; Liang, L. Y.; Gu, B. H. Oxidation and methylation of dissolved elemental mercury by anaerobic bacteria. Nat. Geosci. 2013, 6 (9), 751-754.

(14) Poulin, B. A.; Aiken, G. R.; Nagy, K. L.; Monceau, A.; Krabbenhoft, D. P.; Ryan, J. N. Mercury transformation and release differs with depth and time in a contaminated riparian soil during simulated flooding. Geochim. Cosmochim. Acta 2016, 176, 118-138.

(15) Bouffard, A.; Amyot, M. Importance of elemental mercury in lake sediments. Chemosphere 2009, 74 (8), 1098-1103.

(16) Wiatrowski, H. A.; Das, S.; Kukkadapu, R.; Ilton, E. S.; Barkay, T.; Yee, N. Reduction of Hg(II) to Hg(0) by magnetite. Environ. Sci. Technol. 2009, 43 (14), 5307-5313.

(17) Bone, S. E.; Bargar, J. R.; Sposito, G. Mackinawite (FeS) reduces mercury(II) under sulfidic conditions. Environ. Sci. Technol. 2014, 48 (18), 10681-10689.

(18) Gu, B.; Bian, Y.; Miller, C. L.; Dong, W.; Jiang, X.; Liang, L. Mercury reduction and complexation by natural organic matter in anoxic environments. Proc. Natl. Acad. Sci. U.S.A 2011, 108 (4), 1479-1483.

(19) Wiatrowski, H. A.; Ward, P. M.; Barkay, T. Novel reduction of mercury(II) by mercury-sensitive dissimilatory metal reducing bacteria. Environ. Sci. Technol. 2006, 40 (21), 6690-6696.

(20) Lin, H.; Morrell-Falvey, J. L.; Rao, B.; Liang, L. Y.; Gu, B. H. Coupled mercury-cell sorption, reduction, and oxidation on methylmercury production by *Geobacter sulfurreducens* PCA. Environ. Sci. Technol. 2014, 48 (20), 11969-11976.

(21) Gregoire, D. S.; Poulain. A. J. A physiological role for Hg(II) during phototrophic growth. Nat. Geosci. 2016, 9 (2), 121-125.

(22) Barkay, T.; Kritee, K.; Boyd, E.; Geesey, G. A thermophilic bacterial origin and subsequent constraints by redox, light and salinity on the evolution of the microbial mercuric reductase. Environ. Microbiol. 2010, 12 (11), 2904-2917.

(23) Marteyn, B.; Sakr, S.; Farci, S.; Bedhomme, M.; Chardonnet, S.; Decottignies, P.; Lemaire, S. D.; Cassier-Chauvat, C.; Chauvat, F. The Synechocystis PCC6803 MerA-like enzyme operates in the reduction of both mercury and uranium under the control of the glutaredoxin 1 enzyme. J. Bacteriol. 2013, 195 (18), 4138-4145.

(24) McKinlay, J. B.; Harwood, C. S. Carbon dioxide fixation as a central redox cofactor recycling mechanism in bacteria. Proc. Natl. Acad. Sci. U.S.A 2010, 107 (26), 11669-11675.

(25) Desrochers, K. A. N.; Paulson, K. M. A.; Ptacek, C. J.; Blowes, D. W.; Gould, W. D. Effect of electron donor to sulfate ratio on mercury methylation in floodplain sediments under saturated flow conditions. Geomicrobiol. J. 2015, 32 (10), 924-933.

(26) Asao, M.; Madigan, M. T. Taxonomy, phylogeny, and ecology of the heliobacteria. Photosynth. Res. 2010, 104 (2-3), 103-111.

(27) Girija, K. R.; Vinay, B.; Sasikala, C.; Ramana, C. V. Novel heliobacteria of a few semi-arid tropical soils. Indian J. Microbiol. 2010, 50, S17-S20.

(28) Madigan, M. T., The Family Heliobacteriaceae. In The Prokaryotes: Vol. 4: Bacteria: Firmicutes, Cyanobacteria; Dworkin, M., Falkow, S., Rosenberg, E., Schleifer, K.-H., Stackebrandt, E., Eds.; Springer: New York, N.Y., 2006; pp 951-964

(29) Tang, K. H.; Yue, H.; Blankenship, R. E. Energy metabolism of *Heliobacterium modesticaldum* during phototrophic and chemotrophic growth. BMC Microbiol. 2010, 10, 150.

(30) Lutke-Eversloh, T.; Bahl, H. Metabolic engineering of *Clostridium acetobutylicum*: recent advances to improve butanol production. Curr. Opin. Biotechnol. 2011, 22 (5), 634-647.

(31) Mahadevan, R.; Bond, D. R.; Butler, J. E.; Esteve-Nunez, A.; Coppi, M. V.; Palsson, B. O.; Schilling, C. H.; Lovley, D. Characterization of metabolism in the Fe (III)-reducing organism *Geobacter sulfurreducens* by constraint-based modeling. Applied and environmental microbiology 2006, 72 (2), 1558-1568.

(32) Kimble, L. K.; Mandelco, L.; Woese, C. R.; Madigan, M. T. *Heliobacterium modesticaldum*, sp. nov., a thermo-

(33) Tang, K. H.; Feng, X. Y.; Zhuang, W. Q.; Alvarez-Cohen, L.; Blankenship, R. E.; Tang, Y. J. Carbon flow of Heliobacteria is related more to Clostridia than to the green sulfur bacteria. J. Biol. Chem. 2010, 285 (45), 35104-35112.

(34) Hoffman, P. S.; Bruce, A. M.; Olekhnovich, I.; Warren, C. A.; Burgess, S. L.; Hontecillas, R.; Viladomiu, M.; Bassaganya-Riera, J.; Guerrant, R. L.; Macdonald, T. L. Preclinical studies of amixicile, a systemic therapeutic developed for treatment of *Clostridium difficile* infections that also shows efficacy against *Helicobacter pylori*. Antimicrob. Agents Chemother. 2014, 58 (8), 4703-4712.

(35) Sattley, W. M.; Asao, M.; Tang, J. K. H.; Collins, A. M., Energy conservation in Heliobacteria: Photosynthesis and central metabolism. In The Structural Basis of Biological Energy Generation, Advances in Photosynthesis and Respiration; Hohmann-Marriott, M. F., Ed.; Springer Science, 2014; Vol. 39, pp 231-247.

(36) Sattley, W. M.; Madigan, M. T.; Swingley, W. D.; Cheung, P. C.; Clocksin, K. M.; Conrad, A. L.; Dejesa, L. C.; Honchak, B. M.; Jung, D. O.; Karbach, L. E.; Kurdoglu, A.; Lahiri, S.; Mastrian, S. D.; Page, L. E.; Taylor, H. L.; Wang, Z. T.; Raymond, J.; Chen, M.; Blankenship, R. E.; Touchman, J. W. The genome of *Heliobacterium modesticaldum*, a phototrophic representative of the Firmicutes containing the simplest photosynthetic apparatus. J. Bacteriol. 2008, 190 (13), 4687-4696.

(37) Hatchikian, E. C.; Forget, N.; Fernandez, V. M.; Williams, R.; Cammack, R. Further characterization of the [Fe]-hydrogenase from *Desulfovibrio desulfuricans* ATCC 7757. Eur. J. Biochem. 1992, 209, 357-365.

(38) Schomburg, D.; Schomburg, I.; Chang, A., Class 1—Oxidoreductases X EC 1.9-1.14. In Springer Handbook of Enzymes; Schomburg, D., Schomburg, I., Ed.; Springer-Verlag: Berlin Heidelberg, 2006; Vol. 25, pp 373-381.

(39) Speers, A. M.; Reguera, G. Electron donors supporting growth and electroactivity of *Geobacter sulfurreducens* anode biofilms. Appl. Environ. Microbiol. 2012, 78 (2), 437-444.

(40) Segura, D.; Mahadevan, R.; Juarez, K.; Lovley, D. R. Computational and experimental analysis of redundancy in the central metabolism of *Geobacter sulfurreducens*. PLoS Comput. Biol. 2008, 4, (2). 10.1371/annotation/67743d4d-2993-4d0c-951 b-3f11ce65a8b4

(41) Schaefer, J. K.; Letowski, J.; Barkay, T. mer-mediated resistance and volatilization of Hg(II) under anaerobic conditions. Geomicrobiol. J. 2002, 19 (1), 87-102.

(42) Poulain, A. J.; Amyot, M.; Findlay, D.; Telor, S.; Barkay, T.; Hintelmann, H. Biological and photochemical production of dissolved gaseous mercury in a boreal lake. Limnol. Oceanogr. 2004, 49 (6), 2265-2275.

(43) Bagnato, E.; Aiuppa, A.; Parello, F.; D'Alessandro, W.; Allard, P.; Calabrese, S. Mercury concentration, speciation and budget in volcanic aquifers: Italy and Guadeloupe (Lesser Antilles). J. Volcanol. Geotherm. Res. 2009, 179 (1-2), 96-106.

(44) Liu, S.; Wiatrowski, H. A. Reduction of Hg(II) to Hg(0) by biogenic magnetite from two magnetotactic bacteria. Geomicrobiol. J. 2018, 35 (3), 198-208.

(45) Lu, X.; Liu, Y.; Johs, A.; Zhao, L.; Wang, T.; Yang, Z.; Lin, H.; Elias, D. A.; Pierce, E. M.; Liang, L.; Barkay. T.; Gu, B. Anaerobic mercury methylation and demethylation by *Geobacter bemidjiensis* Bern. Environ. Sci. Technol. 2016, 50 (8), 4366-4373.

(46) Zhao, L. D.; Chen, H. M.; Lu, X.; Lin, H.; Christensen, G. K.; Pierce, E. M.; Gu, B. H. Contrasting effects of dissolved organic matter on mercury methylation by *Geobacter sulfurreducens* PCA and *Desulfovibrio desulfuricans* ND132. Environ. Sci. Technol. 2017, 51 (18), 10468-10475.

(47) Stevenson, A. K.; Kimble, L. K.; Woese, C. R.; Madigan, M. T. Characterization of new phototrophic heliobacteria and their habitats. Photosynth. Res. 1997, 53 (1), 1-12.

All references cited here and elsewhere in the specification are hereby incorporated by reference in their entireties.

What is claimed is:

1. A method for removing mercury contaminant from an aqueous solution, said method comprising:
providing an aqueous solution, the aqueous solution being contaminated with at least trace amounts of an oxidized mercury species;
culturing a photoheterotrophic or fermentative heterotrophic bacteria in the aqueous solution under anoxic conditions in which the bacteria reduce the oxidized mercury species to elemental mercury ($Hg^0$), wherein the bacteria comprises one or more bacteria of the order Clostridiales; and
removing the elemental mercury from the aqueous solution.

2. The method according to claim 1, wherein the bacteria is capable of fermentative growth, and the conditions are anaerobic chemotrophic conditions causing fermentative metabolism in the bacteria.

3. The method according to claim 1, wherein the oxidized mercury species is Hg(II).

4. The method of claim 1, wherein the bacteria generate low potential reduced ferredoxin and/or another reduced redox cofactor, which acts to reduce the oxidized mercury species to elemental mercury.

5. The method of claim 2, wherein the bacteria is a bacteria of the family Heliobacteria.

6. The method of claim 2, wherein the bacteria is *Heliobacterium modesticaldum* or *Clostridium acetobutylicum*.

7. The method of claim 2, wherein the bacteria is *Heliobacterium modesticaldum* Ice1.

8. The method of claim 2, wherein the bacteria is *Clostridium acetobutylicum* ATCC 824.

9. The method of claim 2, wherein the conditions include supplementation with pyruvate or other fermentable carbon source, yeast extract or other growth medium, or both.

10. The method of claim 2, wherein the conditions include supplementation with $NO_2^-$ or other inhibitor of [Fe]-hydrogenase.

11. The method according to claim 1, wherein the bacteria is photoheterotrophic, and the conditions are anaerobic photoheterotrophic conditions using light as an energy source.

12. The method of claim 11, wherein the photoheterotrophic bacteria is a bacteria of the family Heliobacteria.

13. The method of claim 11, wherein the photoheterotrophic bacteria is *Heliobacterium modesticaldum*, or *Heliobacillus mobilis*.

14. The method of claim 13, wherein the bacteria is *Heliobacterium modesticaldum* Ice1.

15. The method of claim 11, wherein the conditions are substantially free of acetate or related organic compounds such that bacterial growth by consuming reduced ferredoxin is prevented.

16. The method of claim 11, wherein the conditions include supplementation with pyruvate or other organic compounds for bacterial growth, yeast extract or other growth medium, or both.

17. The method of claim 1, wherein the step of removing the elemental mercury ($Hg^0$) from the aqueous solution comprises evolving the elemental mercury from the aqueous solution as a gas.

18. The method of claim 17, wherein the step of removing the elemental mercury further comprises capturing the elemental mercury gas in an activated charcoal filter.

19. A bioreactor for removing mercury contaminant from an aqueous solution, the bioreactor comprising:
- a reacting chamber for housing an aqueous solution contaminated with at least trace amounts of an oxidized mercury species and configured to maintain anaerobic conditions therein;
- one or more inlets configured to at least anaerobically supply a culture of photoheterotrophic or fermentative bacteria comprising one or more bacteria of the order Clostridiales to the aqueous solution under anaerobic conditions in which the bacteria generate reduced ferredoxin and/or another reduced redox cofactor, which acts to reduce the oxidized mercury species to elemental mercury ($Hg^0$);
- at least one anoxia line connected to at least one of said one or more inlets to continuously supply a flow of nitrogen or argon gas during operation to maintain said anaerobic conditions; and
- one or more collectors in the form of an outlet for exhausting or venting elemental mercury ($Hg^0$) gas evolving from the aqueous solution, thereby removing the elemental mercury from the aqueous solution.

20. The bioreactor of claim 19, wherein the bioreactor is configurable to block light and trigger fermentative metabolism in the bacteria, or to provide anaerobic photoheterotrophic conditions using light as an energy source, in the reacting chamber; and/or wherein the one or more collectors comprise an outlet for exhausting elemental mercury ($Hg^0$) gas from the reacting chamber, the outlet optionally being configured with a trap for capturing the elemental mercury gas to prevent release to the environment, the trap optionally comprising an activated charcoal filter for capturing the elemental mercury gas; and/or wherein the one or more collectors comprise a trap for capturing the elemental mercury gas evolving from the aqueous solution, the trap optionally comprising an activated charcoal filter for capturing the elemental mercury gas.

* * * * *